US010254844B2

(12) United States Patent
Parshionikar

(10) Patent No.: US 10,254,844 B2
(45) Date of Patent: Apr. 9, 2019

(54) SYSTEMS, METHODS, APPARATUSES, COMPUTER READABLE MEDIUM FOR CONTROLLING ELECTRONIC DEVICES

(71) Applicant: Uday Parshionikar, Mason, OH (US)

(72) Inventor: Uday Parshionikar, Mason, OH (US)

( * ) Notice: Subject to any disclaimer, the term of this patent is extended or adjusted under 35 U.S.C. 154(b) by 0 days.

(21) Appl. No.: 14/897,657

(22) PCT Filed: Jun. 20, 2014

(86) PCT No.: PCT/US2014/043529
§ 371 (c)(1),
(2) Date: Dec. 11, 2015

(87) PCT Pub. No.: WO2014/205422
PCT Pub. Date: Dec. 24, 2014

(65) Prior Publication Data
US 2016/0109961 A1    Apr. 21, 2016

Related U.S. Application Data

(60) Provisional application No. 61/837,215, filed on Jun. 20, 2013.

(51) Int. Cl.
*G06F 3/01*    (2006.01)
(52) U.S. Cl.
CPC .............. *G06F 3/017* (2013.01); *G06F 3/011* (2013.01); *G06F 3/013* (2013.01)
(58) Field of Classification Search
CPC ........... G06F 3/013; G06F 3/011; G06F 3/017
See application file for complete search history.

(56) References Cited

U.S. PATENT DOCUMENTS

| 6,204,828 | B1 | 3/2001 | Amir et al. | |
|---|---|---|---|---|
| 2008/0170123 | A1* | 7/2008 | Albertson | A63B 24/0003 348/157 |
| 2010/0295782 | A1* | 11/2010 | Binder | G01S 3/7864 345/158 |
| 2012/0050144 | A1* | 3/2012 | Morlock | G06T 19/006 345/8 |
| 2012/0094700 | A1* | 4/2012 | Karmarkar | G06F 3/013 455/466 |
| 2012/0272179 | A1 | 10/2012 | Stafford | |
| 2013/0141313 | A1* | 6/2013 | Zhou | G02B 27/017 345/8 |

(Continued)

*Primary Examiner* — Christopher E Leiby
(74) *Attorney, Agent, or Firm* — Taft Stettinius & Hollister LLP; Anthony P. Filomena, II

(57) ABSTRACT

This application includes disclosure of methods, systems, apparatuses as well as principles/algorithms that can be implemented on computer readable medium, for defining user gestures, interpreting user actions, communicating and confirming user intent when communicating with electronic devices. A system for controlling an electronic device by a user is disclosed that includes a microprocessor and a communication link. The microprocessor runs control software for receiving a first signal indicative of a first action of the user, receives a second signal indicative of motion or position of a part of the user's body, and generates a command signal for the electronic device based on a user gesture performed by the user. The communication link communicates the command signal to the electronic device.

38 Claims, 16 Drawing Sheets

(56) References Cited

U.S. PATENT DOCUMENTS

| | | | |
|---|---|---|---|
| 2013/0169560 A1 | 7/2013 | Cederlund et al. | |
| 2014/0152558 A1 | 6/2014 | Salter et al. | |
| 2014/0347265 A1* | 11/2014 | Aimone | G09G 3/003 345/156 |
| 2015/0097772 A1* | 4/2015 | Starner | G06F 3/013 345/158 |
| 2015/0130740 A1 | 5/2015 | Cederlund et al. | |
| 2015/0149956 A1 | 5/2015 | Kempinski et al. | |
| 2015/0338651 A1* | 11/2015 | Wang | G06F 1/163 345/8 |
| 2016/0048223 A1* | 2/2016 | Taguchi | G06F 3/013 345/157 |
| 2016/0350071 A1* | 12/2016 | Murillo | G06F 3/167 |

\* cited by examiner

SYSTEMS, METHODS, APPARATUSES, COMPUTER READABLE MEDIUM FOR CONTROLLING ELECTRONIC DEVICES

This application claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs", the disclosure of which are expressly incorporated herein by reference.

BACKGROUND

Efforts have been made for many years to provide diverse means of controlling/communicating with electronic devices. Some of the means of control involve use of controllers to control/communicate with electronic devices. Other means/methods seek to eliminate the need to hold and/or touch controllers to control electronic devices. They involve communicating intent by means of gestures performed using hands, arms, legs, face and other body parts. Voice commands can also be used to communicate with electronic devices. Communication via brain waves is also possible. Each of these methods have limitations, however, one of the common concerns can be communicating and/or confirming user intention behind actions performed by the user of the electronic device(s).

SUMMARY

This application includes disclosure of methods, systems, apparatuses as well as principles/algorithms that can be implemented on computer readable medium, for defining user gestures, interpreting user actions, communicating and confirming user intent when communicating with electronic devices.

Use of gestures made using eyes are disclosed. Communicating intent for moving an object of interest (OOI) on an electronic device with eye gaze based on actions for enabling/disabling generation of signals (AEGS) is disclosed.

Enabling and disabling of dwell-clicking as well as blink and wink based clicking is disclosed.

Combination of eye gaze tracking and head motion/head tracking to modify an OOI is disclosed.

Detection of accidental selections caused on electronic devices is disclosed.

Activation/Deactivation of functions on an electronic device, including activation of hardware components is disclosed.

Concept of Period of Limited Activity (POLA) as well as its use in determining or confirming user intention is disclosed. Variable duration POLAs are disclosed.

Concept of Primary Control Expression (PCE)/Primary Control Motion (PCM) Stickiness is disclosed. Its role in user gestures is disclosed. Concept of OOI Motion/Modification Disabling Event (ODE) and its role/usage in user gestures is disclosed.

Use of ranges of poses and positions of various body parts in determining user intent is disclosed.

Control systems using multiple OOI Modification Drivers (OMDs) is disclosed.

POLA based multi-command gestures are disclosed.

DETAILED DESCRIPTION

Figure 1:
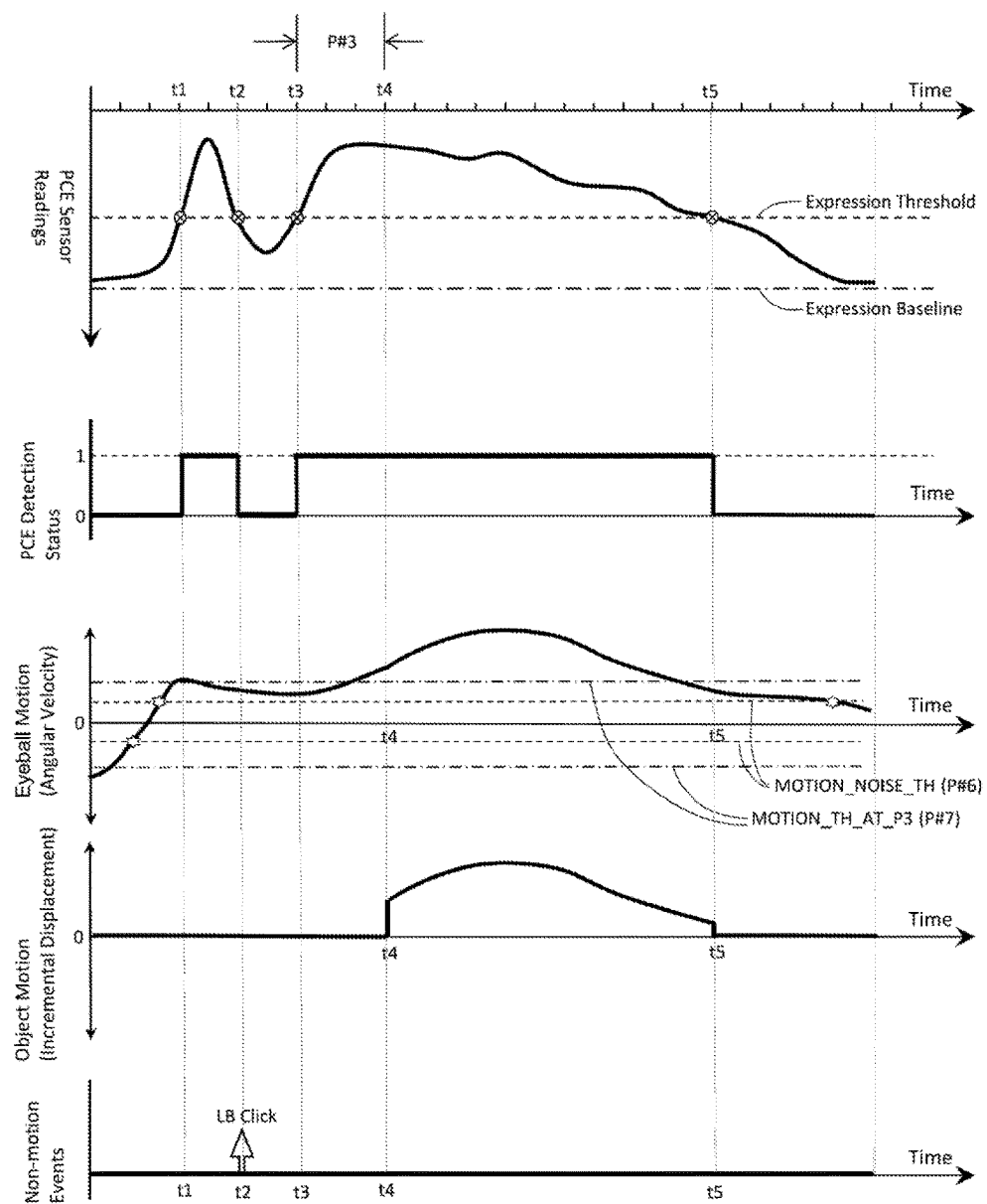
FIG. 1 depicts OOI Motion heuristics with the Eyeball/Gaze tracking in an embodiment of the controller.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The term "electronic device" is used to designate any devices that have a microprocessor and that can be communicated with. A microprocessor can include one or more processors, memory and programmable input/output peripherals. A controller can include one or more microprocessors and/or memory with instructions that can help control or communicate with electronic devices.

A user gesture (or gesture for short) can be defined as a combination of actions performed (by the user of an electronic device) with the intent of communicating with or controlling the electronic device. These user actions can be body actions that can include motions of various body parts, facial expressions, actions to orient and hold various body parts in certain poses/positions/orientations, as well as other bodily actions. Some embodiments can also use actions performed by the user such as speech/speaking, holding breath/inhaling/exhaling, tensing of muscles/body parts (that may or may not be visible externally), and so on as body actions. User actions such as entering meditative or attentive state, consciously relaxing the body with or without meditation, deep breathing, etc. can also be used as indicators of user intent. Such user actions can also be considered as body actions. A user gesture can require some user actions to be performed in a specified sequence, while requiring other user actions to be performed concurrently/simultaneously with each other. User gestures can be recognized and translated by the controller or control system into signals to communicate with and/or control an electronic device. Some user gestures can be recognized and translated into signals to control the controller/control system itself. Signals generated in response to some user gestures may be stored in the control system or controlled device for indefinite amount of time and that stored signal information can be retrieved, communicated and used when required. User actions performed as part of a user gesture can serve various purposes in a specified user gesture. Following are some types of user actions based on the purpose they fulfill in a user gesture.

i. Actions Enabling/Disabling Generation of Signals (AEGS)
ii. Actions Influencing Attributes of Signals being/to be Generated (AIAGS) (By influencing attributes of the signals, the attributes of an Object of Interest on the electronic device can be influenced.)
iii. Actions that Confirm User Intent (ACUI)
iv. Actions that are Demarcators (i.e. help demarcate one part of user gesture from another, or even help demarcate one user gesture from another)
v. Actions with Multiple Purposes (AMP) (i.e. they can fulfill a combination of multiple purposes simultaneously)

A particular user action can serve different purposes (and thereby can be viewed as having different types) when it is used in different user gestures. Further, a particular user action can occur multiple times within a user gesture and can be specified to have different purpose(s) (and therefore can have different type/types) during those occurrences within the user gesture.

Any particular heuristics (explained in this as well as the referenced application) can be implemented in a controller/control system by means of multiple user gestures. For example, one embodiment can implement the selection heuristics in a first user gesture that uses a Smile facial expression as the Primary Control Expression (PCE) and in a second user gesture that uses an Eyebrow Raise facial expression as the PCE, and so on. (As explained in the U.S. patent application Ser. No. 13/418,331, in a Selection Heuristic the user can start and terminate a PCE within specified time bounds to generate a selection command.)

The use of Primary Control Expressions (PCEs) and User Actions to achieve control of electronic devices is disclosed. PCEs are designated facial expressions that can have special significance when communicating with electronic devices. PCEs can be used as AEGS in various user gestures. For example, PCEs are AEGS in Object of Interest (OOI) Motion and Click-and-Drag Heuristics. However, the role of PCE can be viewed as AMP in the Selection Heuristic as the PCE alone enables the generation of signals as well as cause that generation. Various facial expressions include, but are not limited to, smile, frown (with eyebrow or mouth), eyebrow raises, jaw drops, teeth clenches, closing/opening mouth, puffing cheeks, pouting, nose wiggles, ear wiggles, opening/closing eyes, blinking, winking and other motions of the facial muscles. Note that in some cultures, "frown" means contracting the brow where eyebrows can come closer together and the forehead can appear wrinkled. Whereas in other cultures, "frown" can be an expression of mouth where corners of the mouth can be pulled or curled downwards. Therefore, for clarity, we will distinguish between the two kinds of frowns as "eyebrow frown" or "mouth frown" as and when needed; otherwise the term frown will be used to refer to either of them or both.

The concept of Primary Control Motion (PCM) is similar to the concept of PCE. While PCEs are facial expressions, PCMs can be designated bodily motions or pose/position/orientations (of a designated set of one or more body parts). PCMs can include designated combination(s) or sequence(s) of bodily motions that can include motions of the entire head, eyeballs, hands, fingers, arms, shoulders, torso, legs, feet, toes, etc. Note that motions of the entire head such as head nods, head tilts, side to side head motions or head rolls, etc. are considered to be head/body motions and not facial expressions. Motion of the eyeballs is also considered to be body motion and not a facial expression. However, motion of eyelids such as opening/closing of eyes, blinking and winking are considered facial expressions.

Similarly, motion of eyebrows such as eyebrow raises, furrowing of eyebrows and other eyebrow motions are considered facial expressions. Just as PCEs, PCMs are accorded special significance when communicating with electronic devices. A PCM or a PCE can be used as an enabler, trigger, modifier, or even as a specific command, while communicating with an electronic device. PCE and PCM can also comprise actions such as entering meditative/attentive states, tensing internal muscles, relaxing, deep breathing, etc. as these actions can be used to signify user intention and thereby can be used in heuristics explained (as PCEs or PCMs). PCEs and PCMs can be used as AEGS as well as ACUI.

A general rule of thumb for distinguishing PCM from PCE can be to consider if the designated body action involves rigid body motion of body parts versus non-rigid body motion. If the body action involves rigid body motion (that is where the shape of individual parts does not change) then that can be considered to be PCM; e.g. motion of head/eye balls/fingers/forearm/arm, opening or closing of hand into a fist, and so on. If the body action involves non-rigid body motion, such as changing shape of the mouth (by smiling, frowning, pouting, opening/closing the mouth, etc.), changing shape of the cheek muscles, changing opening of the eye/squinting/winking/blinking, raising eye brows, furrowing of the eye brows, etc. can be considered to be facial expressions and therefore designated as PCE. Despite the differences in body actions, PCEs and PCMs can be completely equivalent to each other when it comes to performing designated functions in user gestures, and therefore be used interchangeably in various heuristics and user gestures.

Just as with PCEs, the level of PCMs can be an important aspect in the heuristics and user gestures. Multitudes of measures can be used to measure the level of a PCM, based on suitability for the embodiment of the controller, user preferences, settings, aspects of the controlled device itself, etc. As an example, in one embodiment, one PCM can be the bodily motion of raising the left hand. In this case, the PCM is considered to be initiated when the left hand is raised beyond a specified level (threshold) and terminated when the level of hand raised-ness falls below a second threshold. This level of hand raised-ness can be measured by measuring the relative vertical position of the hand/feature of the hand compared to the position of the elbow, possibly also taking into account of the size of the forearm or upper arm. In another embodiment, PCM can be raising the left hand and closing it in a fist. In this case, the PCM can be considered to not have initiated unless both conditions (raising the left hand and closing it in a fist) are met. Further, the level of this PCM can be defined as a combination of at least one of those constituent actions; for example, the level of this PCM could be defined to be totally based on the level of closed-ness of the left hand, or level of raising of the left hand or a combination of both. Yet another example of PCM can be raising left hand and rotating the left forearm from the elbow to tilt it at an angle towards left or right side. In this case, the angle of tilt can be used in determining the level of the PCM. These were just some illustrative examples of PCMs, and it is to be noted that PCMs can be made up of any number and types of bodily motions and can be used just as PCEs. PCEs as well as PCMs can act as AEGS, ACUI as well as AMPs in user gestures.

An Object of Interest (OOI) can be a cursor, pointer, graphical icon, view/camera angle, direction of interest, selected text, selected area of a graphical display, scroll bar or any other virtual/graphical entity on the display of an electronic device, etc. An OOI can also be the currently selected physical button/slider/knob or any other input mechanism on the controlled electronic device. Typically, when an OOI is chosen to be influenced by means of a user gesture, there is an Attribute of Interest (AOI) that belongs to that OOI that is implicitly being considered. For example, if a designated OOI is a pointer on the display screen of a computer, when performing the user gesture for moving the pointer, it is the attribute "location" (the AOI) of the pointer (OOI) that is being modified as part of the OOI Motion heuristics or Click-and-Drag heuristics. If the designated OOI was the scroll bar belonging to a window on a computer screen, then the AOI can be the location of the "scroll box" (a.k.a. "thumb") on the scroll bar. Then "motion" of the scroll bar/box really refers to changing the attribute location (the AOI) of the scroll box (the OOI). People skilled in the art will realize that "motion" of OOI is really a special case of "modification" of the chosen attribute of interest (AOI) of the OOI. Therefore, any reference to "moving" the OOI or "motion" of the OOI in any of the heuristics explained in this document can be interpreted to include "modifying" or "modification" of the attribute of interest (AOI) of the OOI. Following are few illustrative examples of OOI and AOI.

Different AOIs can be affected as part of the same user gesture. For example, when using the OOI Motion or Click-And-Drag Heuristics/user gestures to control a Home Entertainment System, based on the duration for which body motion is being held steady (i.e. within specified threshold) after the initiation of the PCE/PCM, the AOI can change from the identifier of the currently selected button to the level setting of the currently selected button.

Body actions such as motion of one or more body parts and/or placing/posing/orienting one or more body parts in certain positions (including motions and poses/positions of the entire head, eyeballs, arms, hands, fingers, legs, torso, and other body parts) or other body actions that have not been already designated as PCM/PCE can be designated to be used for purposes of modifying/influencing designated attributes of an OOI. These designated body actions will be called OOI Modification Drivers (OMD). An electronic device can then be controlled via use of a combination of PCMs and/or PCEs and/or OMDs. A User Gesture then can be a specified combination of PCMs, PCEs and OMDs performed or held in succession and/or simultaneously with each other. Some embodiments can also use body actions such as speech/speaking, holding breath/inhaling/exhaling, tensing of muscles/body parts (that may or may not be observable), entering meditative or attentive state, etc., which can be designated as PCE/PCM or OMD. User gestures can be used to generate signals for communication with electronic devices. Certain user actions/user gestures can also be used to signify or confirm user intent behind other user actions/gestures and thereby used to decide if/when signals should be generated to communicate with the controlled device.

The term "positions" can include linear/translational positions as well as angular positions. Thereby the term positions can include angular orientations.

OMDs can also include motions & positions of objects that are not part of the body but that can be directly or indirectly moved by the user. For example, motion of a pencil held by the user can be used as an OMD, provided that the user is directly or indirectly causing the motion of the pencil and the controller/control system is able to sense the motion of the pencil. A particular action or set of actions can be used for multiple purposes, for example as OMDs/

| # | Object of Interest (OOI) | Attribute of Interest (AOI) belonging to OOI | Result of Modification of AOI (via user gestures) |
|---|---|---|---|
| 1. | Cursor/Pointer | Location | Cursor/Pointer moves on the Display Screen |
| 2. | Window being displayed on Screen | Zoom factor | The size of the content being displayed in the window changes |
| 3. | Button/Input mechanism on a Home Entertainment System that is of current interest | Identifier of the Button/Input Mechanism (that is currently selected) | A different button gets selected (which can be observable as a change in highlighting of the button/input mechanism) |
| 4. | Wheel Chair | Location | Wheel chair moves |
| 5. | Sounds generated by a Stereo system | Volume | Sound Volume changes |
| 6. | Song on a Music Player | Song Identifier | Selection of Song changes |
| 7. | Current Location Indicator (within a Song/Media file which is being played on a Media Player) | Location within a Song/Media file | The current location from which the song/media file can start playing changes. |

AIAGS (Actions influencing attributes of generated signals) modifying signals for motion of an OOI, as Demarcators, ACUIs as well as AMPs.

The presence of a PCE/PCM, magnitude/level of the PCE/PCM as well as the time variance of magnitude/level of the PCE/PCM can be considered along with the magnitude/direction as well as the variance of magnitude/direction of OMD, in order to translate user actions into commands/control signals for the electronic device being controlled. The presence of a PCE/PCM can also be defined in terms of a threshold on the value of the magnitude/level of the PCE/PCM. Time variance of PCE/PCM or OMD can include rate of change of magnitude/level of PCE/PCM or OMD with respect to time at any given instant. Alternatively, time variance can also be measured as change over a specified time interval or between two designated events (such as start or end of two different iterations when running the Control Software). Time variance can also include change in the presence/bounded-ness of (the magnitude/level of) PCE/PCM or OMD over a specified time period. Time variance can also include presence of (the magnitude/level of) PCE/PCM or OMD above or below a specified threshold, as well as other indicators of measuring time variance. Further, time variance can be expressed as amount of change over a standard unit of time or as amount of change over a designated number of (contiguous) iterations/measurements. Magnitude/levels as well as time variance of PCEs/PCMs/OMDs can be considered in relation to each other for the purpose of interpreting user actions and translating them into commands for the electronic device. The time concurrency of PCE/PCMs with the OMD can be an important consideration as well. Examples of this approach of interpretation and translation of user actions into commands/control signals/communications with the controlled electronic device are presented herein.

When an OOI is such that it cannot be physically or virtually moved by the user (for example a physical button/dial/slider/etc. on an electronic device or an immovable graphical icon on a display screen of an electronic device), motion of the OOI means change in designation of the currently selected button/graphical icon/input mechanism to a new one. In such cases, when the user attempts to "move" the OOI, the system merely selects a new input mechanism/button as the new OOI. (As explained earlier in this document, the AOI in this case is the identifier of the input mechanism/button that is currently selected.) This change in designation of currently selected input mechanism can be done in accordance to the OMD. This process is further explained in the above mentioned patent application(s).

As explained in U.S. patent application Ser. No. 13/418, 331, controllers can be worn on the face and can allow hands-free control of various device. They can be made to look like eye glasses or phone headsets. In some embodiments, the control system does not require the user to wear any apparatus, but senses the user gestures via image sensors or image processing systems. The above application also lists various parameters that can be used to define user gestures and/or influence the behavior of the control system/controller. The above application also describes various components that can be considered to be part of a controller or control system for controlling an electronic device. Note that the term "electronic device" is used to designate any devices that have a microprocessor (or integrated circuits) and which can be controlled or whose operation(s) can be influenced, or simply can be communicated with. This includes, but is not limited to computers (desktop, laptop, tablet and others), mobile phones, heads-up display (HUD) and head mounted display (HMD) devices, augmented reality devices, video game systems, home-theater systems, industrial machinery, medical equipment, household appliances as well as light fixtures. Note that a microprocessor can include one or more processors, memory, and programmable input/output peripherals. A controller/control system can include one or more microprocessors and/or memory with instructions that can help control or communicate with electronic devices. These instructions can be included in the Control Software (as explained in the above mentioned application) and can receive signals from various sensors regarding information indicative of motion or position of various body parts of the user, facial expressions of the user, brain-waves, speech, as well as any other actions performed by the user. The Communication Link described in the above patent application can communicate various command signals to the electronic device to be controlled. Note that the Communication Link can be a combination of hardware and software. Please refer to the above mentioned patent application for more details of the above mentioned embodiments as well as other embodiments mentioned therein. This application discloses concepts and principles that can be used with the embodiments in the above mentioned application as well as others that may or may not be disclosed in this application.

Head motion tracking can be replaced by eye tracking or gaze tracking or any other suitable body actions in the various heuristics described. The body part motions (head, eye balls, etc.) can be extracted by using an image processing system using image processing and computer vision algorithms. Further, specialized eye or gaze tracking hardware can also be used (instead of regular image sensors such as webcams) to extract the eye gaze and/or motion information; this includes, but is not limited to Electrooculography (EOG) sensors and other equipment that shine light beams on the eyeballs and measure how they get reflected by the eyeballs. Note that eye gaze information can be used to determine eyeball motion information such as angular velocity, etc. at any given instant of time. This eye gaze and motion information can then be used to drive the OOI motion.

FIG. 1 shows exemplary control graphs for an exemplary embodiment using eyeball or gaze tracking for purpose of achieving OOI motion on an electronic device. The overall OOI motion heuristic is explained in U.S. patent application Ser. No. 13/418,331. The PCE Sensor reading graph and the PCE Detection status are as explained in the above mentioned patent application. The third graph (from top) shows Eyeball Motion. The OOI motion does not start unless P#3 amount of time is elapsed after the initiation of a Primary Control Expression (PCE) such as a smile, eyebrow raise, jaw drop, frown, mouth open, mouth pout, etc. (Note: P3 and other parameters are explained in the above mentioned patent application.) The motion of the OOI starts at time t4 and then continues in accordance to the motion of the eyeball and terminates when the user stops the facial expression. In another variation, motion of the OOI starts and continues starting at time t4 in accordance with the eye gaze information itself and terminates when the user stops the facial expression (PCE). This means that in this scenario, at time t4, the OOI can jump to where the user is looking at that time. From that time, the OOI can continue to follow the gaze until time t5 when the OOI motion is stopped (as the PCE is terminated). If the gaze leaves the bounds of the display screen before time t5, the OOI can stay at the last location within the bounds of the screen until the point in time when the user's gaze comes back to be within the bounds of the screen. If the PCE is still active, the OOI then can start moving in accordance to the gaze, however, other variations are possible where the motion of the OOI is disabled once the gaze leaves the screen and not reinstated when the gaze returns to be within the bounds of the screen.

In other variations, different commands can be invoked when the gaze leaves the screen with the PCE still active. For example, starting a PCE/PCM when the gaze is in the middle of the screen, but leaving the bounds of the screen from the right edge if the screen could be taken to mean a "swipe" gesture (similar to a swipe gesture done on touch screen of a phone or tablet, etc.) in the right direction. Similarly, leaving the screen bounds when the PCE/PCM is active from other edges or corner areas of the screen can lead to other commands (such as, but not limited to) swipe left, swipe up, swipe down, Go back/forward, Page Up/down, etc. The invocation of such commands can be made conditional on how far or how fast the gaze or eyeball is moving before/during/after crossing the bounds of the screen. For example, one embodiment can require that the gaze leaves the screen with at least the angular velocity of 30 degrees/second for that departure to be interpreted with any special significance. (Note that other measures of motion can also be used such as translational velocity/acceleration of the gaze, angular acceleration, etc.) Further, different ranges of velocity/motion can lead to different commands. So, if the gaze leaves the screen area from the right edge at angular velocities between 30-90 degrees/second that could be interpreted as a scroll/pan to the right command. However, if the angular velocity is more than 90 degrees, it can be treated as a right swipe. In a further variation, once a command is initiated by moving the gaze out of bounds, the OOI motion can be disabled even if the gaze returns within the bounds while the PCE/PCM is still active, however, the initiated command can be reinitiated automatically at periodic intervals as long as the PCE/PCM is held active (without having to keep on moving the gaze outside the bound). Some embodiments can have commands invoked based on activation of a PCE/PCM and gaze on a particular region within the bounds of the screen. For example, if the user looks towards to the bottom part of the screen, the screen can start scrolling downwards if the user starts a PCE when the gaze is in the bottom part of the screen; the scrolling continues as long as the PCE/PCM is in progress (active). If when the scrolling and PCE/PCM is in progress, the user starts to look at the left side of the screen, then that can stop the down scroll and start a left scroll (or pan) instead. If the user looks at the left corner of the screen and initiates a PCE/PCM, that can start left scroll/pan and down scroll/pan at the same time (and continue till the PCE/PCM is in progress). In some embodiments, different PCE/PCM's can be used to mean different commands as well. For example, if Smile is being used as a PCE to activate/deactivate OOI motion and regular clicks, Eyebrow raises can be used as a PCE to cause a Click-and-Drag by activating the OOI motion upon an eyebrow raise but also sending a Left-Mouse Button Press event just before the OOI starts moving (at time t4) and sending a Left-Mouse Button Release event when OOI motion is disabled at time t5 (just when the PCE is terminated). Using the above illustrative examples, people skilled in the art can realize that different combinations of different parameters such as side or corner of gaze's exit or entry, speed before/during/after exit/entry, time spent outside of bounds (after exit), speed of motion when coming back into the bounds, the place of initiation of PCE (inside/outside the bounds, specific areas of the screens, etc.), types of PCEs, etc. can be combined to define various commands (which in effect can be viewed as eye gestures).

Figure 2:
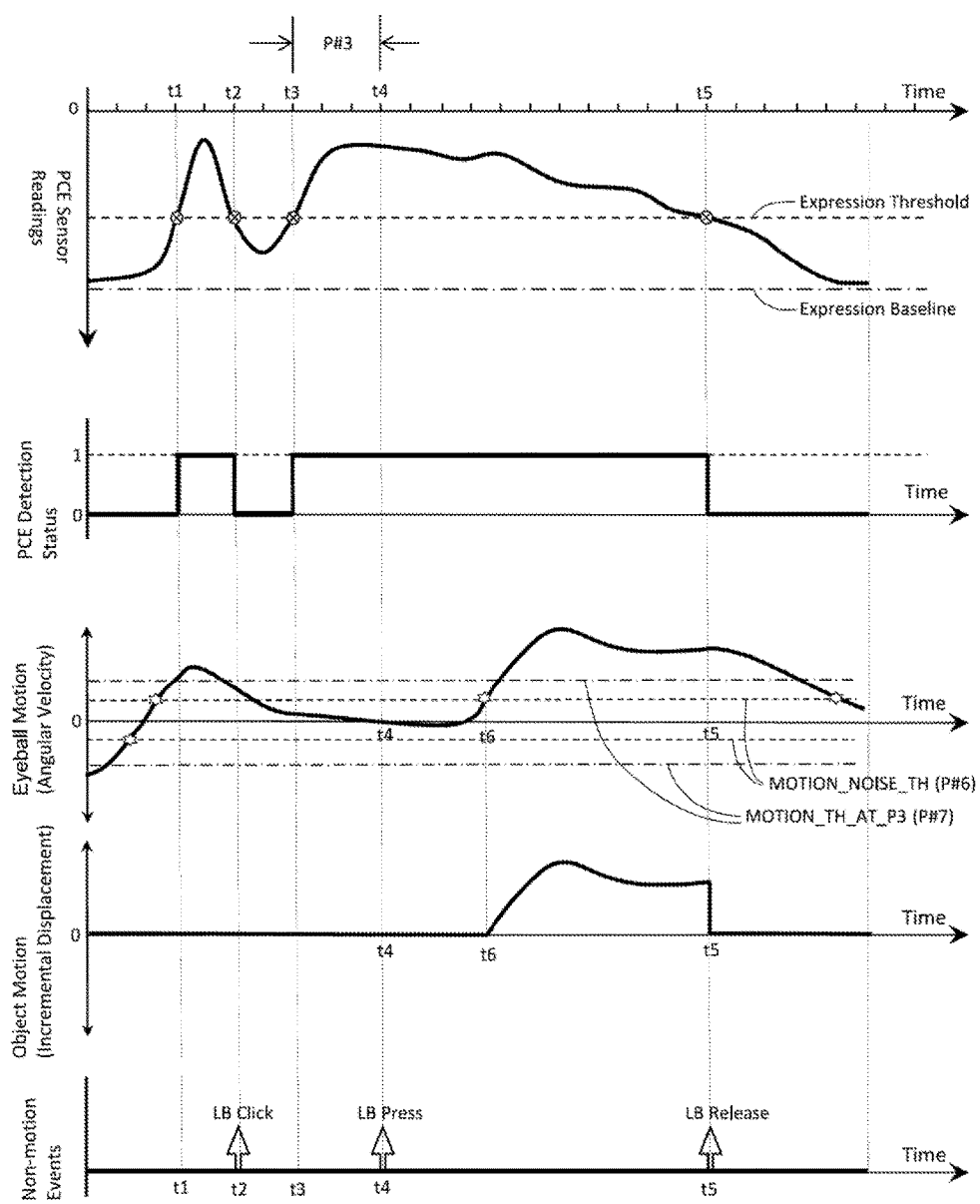
FIG. 2 depicts Click and Drag heuristics with the Eyeball/Gaze tracking in an embodiment.

FIG. 2 demonstrates an embodiment of the Click and Drag heuristics with the Eyeball/Gaze tracking. The user initiates a PCE at time t3 and then holds the eyeball/gaze steady enough that the absolute magnitude of the eyeball motion (angular velocity) does not exceed the value specified by parameter P#7 (Motion Threshold at time P#3 after PCE start) during the time period t3 through t4. Variations of this heuristic are possible wherein the threshold check is done only at one/more specific times during the time period t3 through t4. If eyeball motion during time period t3 through t4 does not exceed P#7 (that is the user's gaze was reasonably steady), then a Left Mouse Button (LB Press) is generated at time t4. (Further variations are possible by checking the cumulative change in gaze direction in the time period t3 through t4 to be within a specified angular displacement threshold, in which case a LB Press event is generated. Similarly, the steadiness of gaze could be ascertained by the user holding the gaze within a specified area on the screen, or any location in space for that matter, during the specified time period (t3-t4 in this example). This specified area could be of any shape or size. OOI motion can start at time t4 and continue in accordance to the eyeball motion until the time the PCE expression ends (shown as time t5 in FIG. 2). Note that similar to the case with head motion, angular motions of the eyeball less than parameter P#6 can be ignored (as shown during time period t4 through t6 in FIG. 2). In a variation, once the OOI motion is started at time t4, the OOI motions keep in accordance to the latest eye gaze direction (instead of instantaneous angular velocity of eye balls) during time t4 through t5. A LB Release event is generated when the PCE is terminated at time t5, thereby completing the Click and Drag process.

Figure 3:
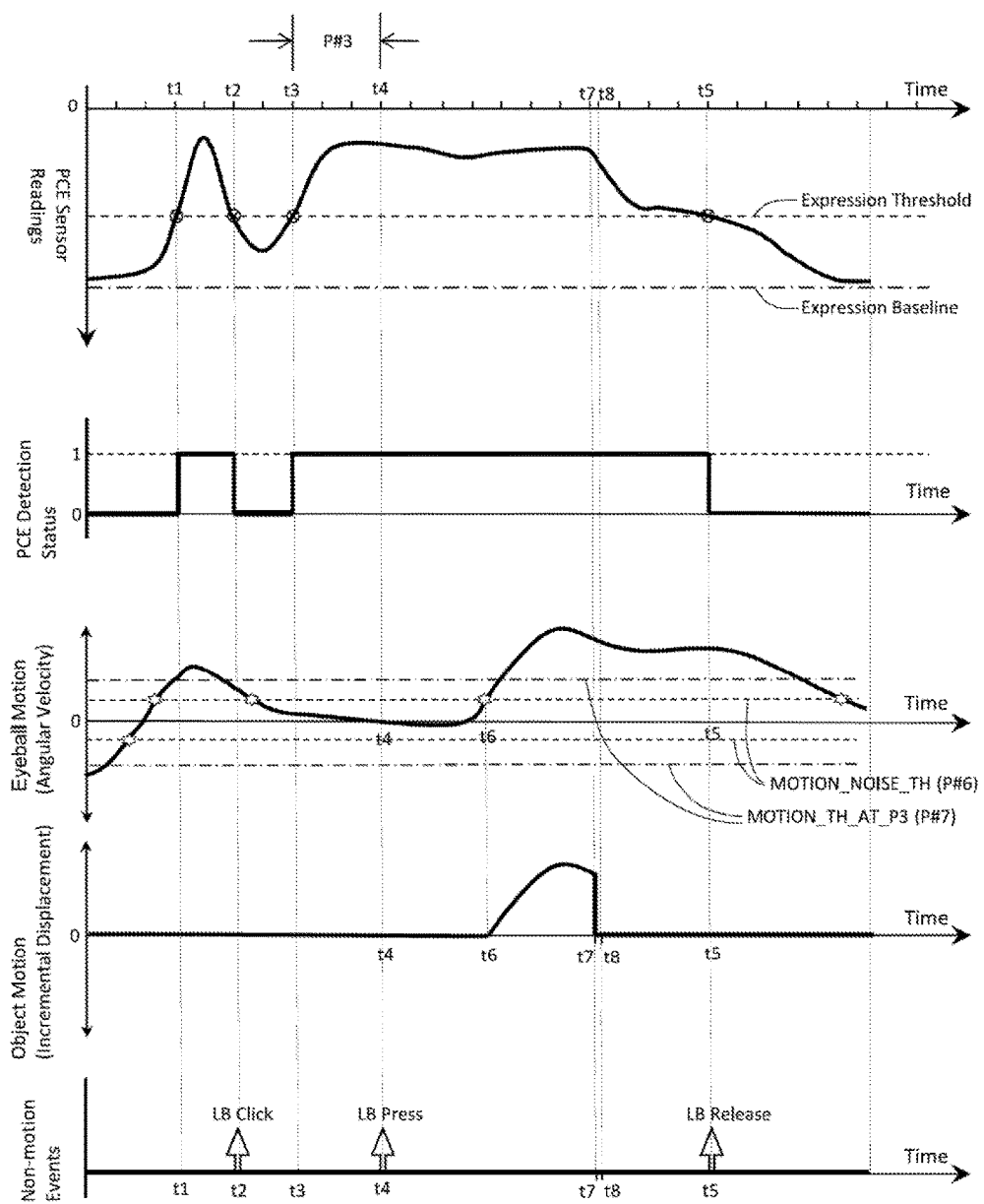
FIG. 3 depicts "PCE Falling Too Fast" heuristics in an embodiment.
Figure 4:
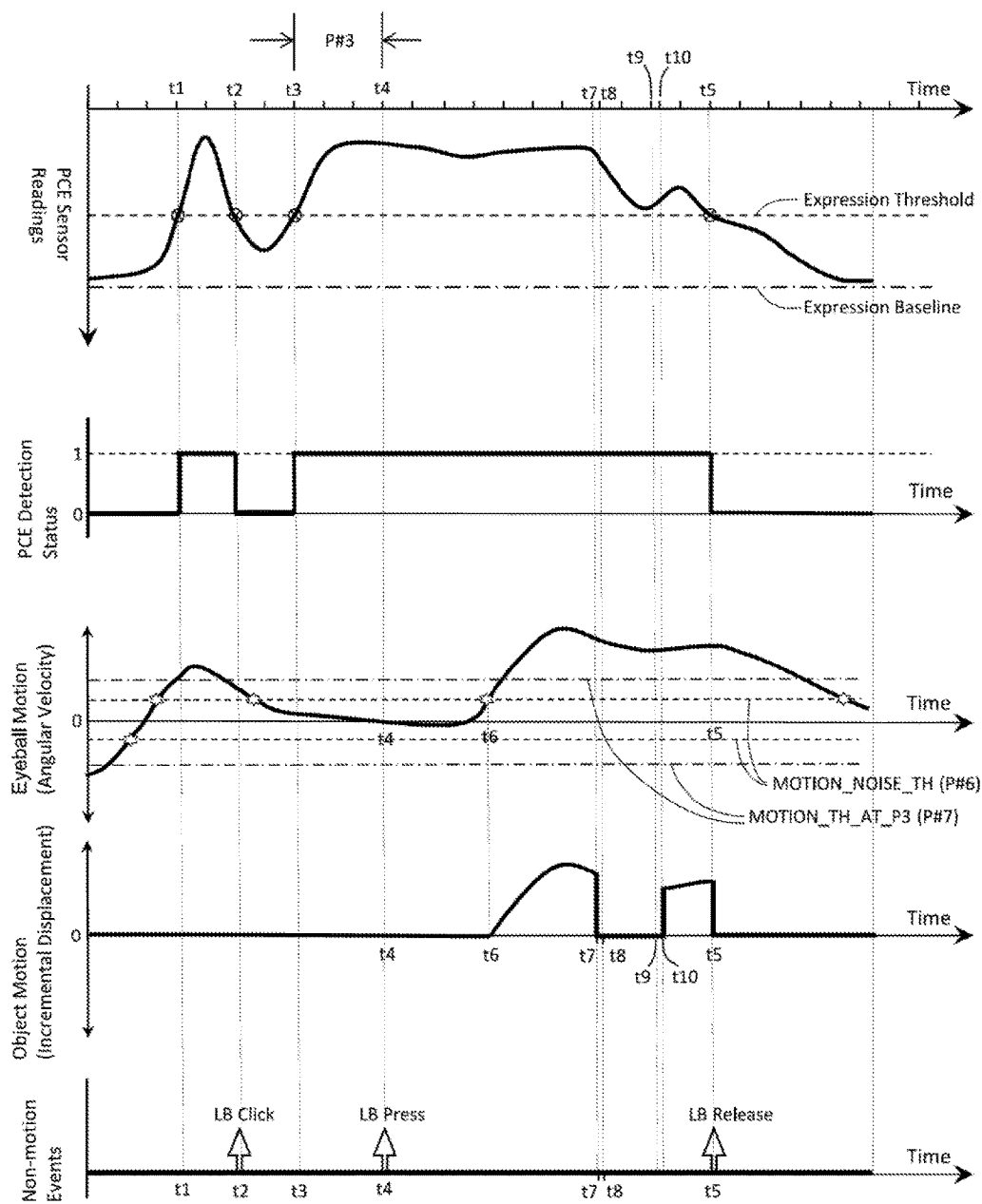
FIG. 4 depicts "PCE Rising Again" heuristics in an embodiment.

FIGS. 3 and 4 illustrate the "PCE Falling Too Fast" and "PCE Rising Again" heuristics. These figures are similar to FIGS. 22 and 23 from the above mentioned US patent application, except for the use of "Eyeball Motion" instead of "Head Motion". These heuristics are similar except that they are driven by Eyeball Motion versus Head Motion and the differences and variations as described in the preceding paragraphs.

Figure 5:
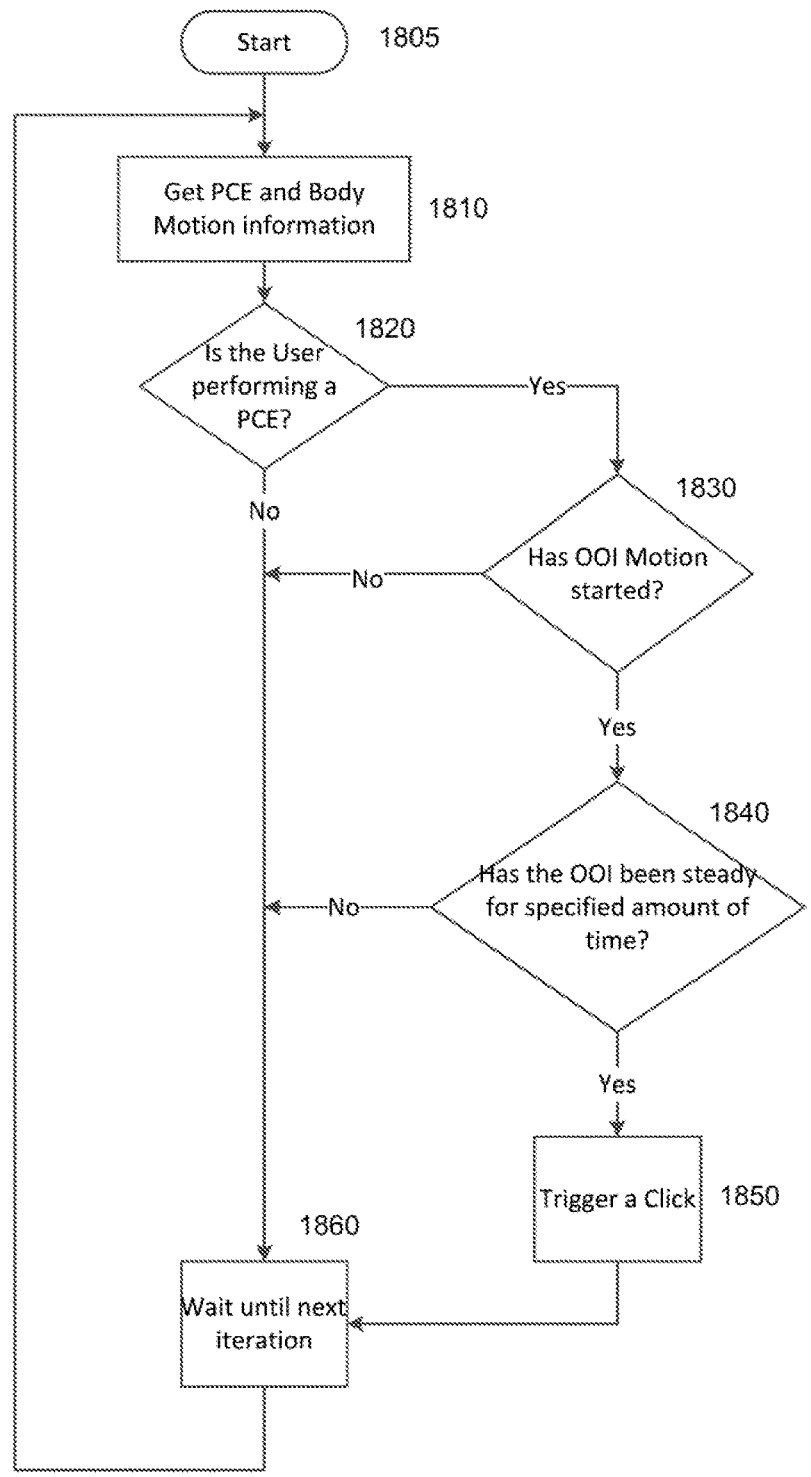
FIG. 5 shows an example of the control flow that can be included in the Control Software of an embodiment of the Controller.

Eye gaze tracking and head tracking systems can utilize dwell-clicking mechanism for selection (clicking) In dwell-clicking, one holds the OOI steady for a specified amount of time for the system to cause a click. (Note that this "steadiness" is typically measured by checking if the OOI has been held by the user within certain distance from the initial position or within a specified area of the display screen for specified amount of time. However, this method can cause too many unintentional clicks when a user inadvertently keeps the OOI steady in a part of the screen for more than the specified amount of time. This can lead to user frustration and loss of productivity. Electronic devices can leverage the heuristics described herein where presence of a PCE/PCM could be used to enable dwell-clicking mechanism or any other mechanism(s). In one embodiment, dwell-clicking mechanism is activated/enabled only when a specified PCE is in progress, and is terminated/disabled when the PCE ends. FIG. 5 shows an example of the control flow that can be included in the Control Software of the embodiment of a Controller (as described in the above mentioned US patent application) where a PCE is used along with OOI location information, to ascertain a dwell performed by the user is indeed intended to cause a click. (Note that the OOI location information could be derived from OMD/Body Motion information.) The flow starts on step 1805. Step 1810 collects the PCE information and Body motion information (which could be Eye Gaze or Head/Body Motion information). Step 1820 checks if the PCE is currently in progress (that is the user actively making the specified facial expression strongly enough for it to be detected by the system). If the PCE is not currently being performed, the control flow goes to Step 1860 where the system waits for the next iteration to start and goes back to step 1810 to process the next iteration, as well as it can reset the dwell timer. On the other hand, if step 1820 determines that the PCE is being currently performed then step 1830 checks if the OOI motion has been started since the start of this particular PCE. (This effectively checks if time specified by P#3 has elapsed since the start of this PCE, as that is the condition for OOI motion to start.) If OOI motion has not yet started, the control can go to step 1860; otherwise, step 1840 can check if the OOI has been steady for the specified amount of time continuously (this is the dwell check). If not, the control can go to step 1860; otherwise, step 1850 can trigger a click and can reset the dwell time counter. Note that in a variation of this flow, different types of commands (such as single click, double click, right click, scroll, pan, zoom, rotate, etc.) can be triggered at block 1850 based on the length of the dwell time.

Eye gaze tracking and head tracking systems can also utilize blinking or winking to trigger a selection (clicking) Just as dwell-clicking, blink clicking could be combined with a PCE to ascertain user intent (and thereby to avoid unintentional clicks when the user blinks without meaning to click). Further, blinking/winking can also be used along with the PCE for other commands/heuristics. For example, an alternate version of Click and Drag heuristic could be devised as follows. The user starts the OOI motion using head motion/gaze and PCE (as described earlier). However, to cause a Left Mouse Button (LB) Press event, instead of holding the head/gaze steady, the user can simply blink/wink. This can start the Click and Drag process. The LB Release event can be generated on the next blink/wink or the end of the PCE (whichever happens first). The LB Release event ends the Click and Drag process. Note that if the LB Release was not caused by the end of PCE (that means the PCE is still active), then the OOI motion continues and the next blink/wink causes another LB Press event thereby starting the next Click and Drag process which ends upon a LB Release event caused by the next blink/wink or end of PCE. This process can continue indefinitely until the PCE is terminated. In a variation of this process, the user could blink/wink a specified amount of times within a specified amount of time duration. For example, instead of a single blink/wink, the user could be required to blink/wink two times within 500 milliseconds to cause the LB Press or LB Release event. Further, similar to blink/wink, other facial expressions that do not interfere with the PCE can be used to cause the LB Press and Release. For example, if the PCE is a smile, then the LB Press/Release can be performed by not only blinks/winks, but also by eyebrow frowns, eyebrow raises and other facial expressions that do not interfere with the performance of a smile (i.e. the PCE in this example).

In some embodiments, eye gaze methods of moving OOI can be used in conjunction with motions of other parts of the body. For example, eye gaze only methods can be used to move and roughly place an OOI on a display screen and then PCE/PCM and OMD (a different OMD other than eye gaze) can be used to fine-tune the placement of the OOI. In another variation, OOI motion can be enabled/initiated when a PCE is initiated and the OOI can be moved in accordance with multiple OMDs such as eye gaze as well as head motion, etc. simultaneously or alternately. For example, the initial motion of OOI can follow eye gaze but then when the eye gaze motion falls below a specified threshold and/or the head/body motion increases above another specified threshold, OOI can be driven by head/body motion instead. In one illustration, OOI can be driven purely by eye gaze till the point that a PCE is started; from this point in time, the OOI motion can be controlled by just the PCE and not the eye gaze. Therefore in this illustration, the gross/large motion of the OOI can be controlled by eye gaze and the fine motion can be controlled by head motion (or any other OMD for that matter). Another illustration of this concept is when the OOI is a scroll-bar (visible or invisible) or all/part of the text/pictures/other matter being displayed in a window on the display screen of a controlled device. The motion of this OOI (which leads to scrolling in this example) can then be made dependent on both the detection of the PCE as well as eye gaze direction value. In other words, scrolling or any other function on the controlled device can be made dependent (or be enabled/disabled) based on occurrence of a specified PCE (at a specified level) as well as eye gaze or head/body pose (or even a gesture). Thereby, for example, scrolling on a tablet or smart phone can be driven by head motion or motion of the tablet or smartphone itself, but only if the user is looking towards the device (or some other specified direction). This concept of using a combination of eye gaze direction and level of PCE/PCM as an enabling or disabling mechanism can be applied to any functions, button, etc. on the controlled device.

In day-to-day use of electronic devices, there are occasions when commands are invoked on the electronic devices without the user really intending to do so. For example, there are times when phone calls are made from mobile phones unbeknownst to the user as buttons get touched or pressed accidentally. Following explanation describes how some heuristics described can help with this common problem as well as many others by use of PCEs/PCMs. In some embodiments users can use PCEs/PCMs to enable or disable any number of buttons or functions on an electronic device. As an illustration, if the facial expression of a smile was the PCE, then the "make a phone call" icon/button on a mobile phone can be conditionally enabled based on the level of smile the user has on their face while attempting to use that "button/icon". (Note that on some electronic devices, it is possible to call someone on the phone by touching their name or other information belonging to them, on the touch screen of the device. For the sake of simplicity of discussion, those areas of the screen that display such information are also implied/included as part of the make-a-phone-call "button/icon".) The camera/image sensor on the mobile phone can capture the image of the user and then image-processing/computer vision algorithms can be used to sense the level of smile on their face. If the smile is determined to be sufficient (that is above a specified threshold or within a specified range), then the "make a phone call" button/icon is enabled so that when the button/icon is touched it would actually attempt to make a phone call. However, if the user was not visible to the image sensor, or looking away (so that their smile was not completely visible) or if their eye gaze was not pointing in a specific direction (e.g. towards a part of the electronic device or surrounding, etc.) or if they were not smiling enough (that is their smile level is not at/beyond a specified threshold), the "Make a phone call" button may be visible but in a disabled state so that even if the user touched the "button/icon", no phone call would be made. In fact, in this example, the button/icon can be hidden on the mobile phone unless the user is smiling enough. Further, when the user is done talking on the phone call, they can be required to perform a PCE/PCM again so that they can activate the "End phone call" button to end the phone call. This illustrates how the heuristic can be used to assure/ confirm user intent while using an electronic device. This can be very useful for a multitude of other commands including send email, delete email, delete contact, etc. (with a variety of PCEs/PCMs/combinations thereof) to convey to the electronic device that the user really intends to perform the function and that this command was not invoked accidentally without the user knowledge or intent. Further, this can also streamline user interfaces for electronic devices where the need for asking for user confirmation upon the attempt to invoke certain commands can be alleviated. For example, if the user attempts to "Delete a Contact" while performing the appropriate PCE/PCM at the appropriate level, they may not be asked to provide any further confirmation of their intent. Some embodiments can also provide feedback mechanisms using visual, auditory, tactile, haptic, olfactory, etc. indicators regards to the level of PCE/PCM sensed (as performed by the user) as well as if that is sufficient enough to enable certain commands. Certain commands may require even multiple PCEs/PCMs to be active at the same time to provide confirmation of intent. For example, to delete an email just one PCE (e.g. smile) can be required, but to delete a contact the user can be required to smile and raise their eyebrows at the same time. Further, parameter P#3 (TIME_TO_HOLD_PCE_BEFORE_MOVEMENT, as explained in the above mentioned US patent application) can be specified on a command by command basis or even on a PCE by PCE basis. Therefore, certain commands/functions can require the PCE(s/PCMs) to be held longer than for other commands/PCEs/PCMs before the command/function can be enabled. On the flip side, a new parameter can be defined that can dictate the amount of time an enabled button/function/etc. can stay enabled even after the completion of PCE/PCM. This can allow prevention of accidental disablement of the command/ function if the user happens to look/step away. (Please also refer to concept of "PCE/PCM Stickiness" described later in this document, as that can be also used for enablement/ disablement as described here.) Further, as explained elsewhere in the document, a different threshold can be set for enabling versus disabling that can further allow user convenience. In yet another variation, raising a hand can be a designated PCE/PCM, and smile can be another designated PCE/PCM. In this case, enabling a particular command button can be made conditional on the user not only smiling but also raising their hand simultaneously. Similarly, the motion/position of eyeballs (including direction of eye gaze) can also be used as the sole PCM or an additional PCM. Therefore, for example, the "make a phone call" function can be enabled/activated only if the user is looking at the smart phone (the controlled device), or alternatively, the user is looking in a particular direction (by means of combination of head pose and eye gaze direction) as well as simultaneously performing the specified PCE (such as a smile, etc.). Scrolling, Swiping and other functions can also be similarly activated based on presence of combination of a PCE and eye gaze/head pose. Another example can be where the voice recognition function of the controlled device is activated based on a combination of a PCE (Smile, eyebrow raise, etc.) and OMD (such as eye gaze, head motion/pose, hand raise, etc.) It will be obvious to persons knowledgeable in the art that a multitude of combinations of PCEs or PCMs can be used to enable or disable or trigger multitude of commands/functions (software or hardware)/accessories/ etc. that may or may not use OMDs for their execution.

The concept of using combinations of PCEs/PCMs to enable certain functionality can be used for activating certain hardware components. For example, if the designated PCE is a smile, then a laptop computer may not activate its keyboard until the user is facing the laptop and has a smile on his/her face for certain amount of time and/or looking in a particular direction (such as towards the computer). Once activated, the keyboard can be made to stay activated as long as the user is in front of the laptop, without necessarily having that same level of smile that was required to activate the keyboard. However, if the user starts frowning with mouth, or just steps away from the laptop, the keyboard can become inactive. This can even encourage users to smile more often. Note that a neutral expression can also be treated as a type of expression that can be used as a PCE. Therefore, for example, a keyboard or any hardware or command for that matter, can be enabled on a neutral expression from the user, and the command can be disabled on a frown or even a smile. The neutral expression requirement may be sufficient as a confirmation for many commands as the mere presence of the user in front of the electronic device (or in front of a camera) may be a sufficient of a confirmation of the user's intent in executing a number of different commands. Further assurance of user intent can also be had based on user gaze. Certain commands can also require further validation by means of user gaze. Certain commands may be activated only if the user is looking in certain direction. For example, clicking or dragging OOI can require the user to look at a part of the controlled electronic device (such as the camera, display screen, etc.), or even just the general direction of the electronic device. Other commands may be activated when the user is not looking in certain direction. For example, when user is playing a video game or taking a test, certain areas of the screen as well as certain button/icon can be displayed only when the user is not looking at them. (This way someone else sitting next to them can see them but the main user cannot see/use them.) The eye gaze direction can be further combined with PCEs and PCMs to be used as confirmation of user intent, enabling or disabling various commands/buttons/functions, affecting visibility of various areas of the display screen of controlled electronic device, or even enabling/disabling various hardware components, accessories, etc.

Other techniques can also be used in combination with or as replacement of all the above mentioned techniques for establishing user intent. In one embodiment, proximity sensors, distance sensors, touch sensors, image sensors and the like can be used to detect if the electronic device close to another object. Proximity/Touch/presence can be sensed at multiple areas on and around the area/surface of the device that holds or displays those buttons/touch sensitive areas. (Image sensors and others can also be used.) Based on the patterns/shapes of sensed areas of proximity and/or touch, it can be deduced if the object close to or touching the device is small as a fingertip or is a larger part of the body (such as palm or entire finger) or something that may not even be a body part. When size of the area where proximity or touch is detected is larger than a typical fingertip, and/or when the shape of the actual area of touch does not resemble typical shape of a fingertip touch, those instances can be flagged as inadvertent selection/actuation for some commands. This approach can be used to detect potential accidental phone dialing attempts made when carrying a phone on the user's body (in a shirt or pant pocket or other clothing items) or even being carried inside objects such as purses, automobile glove compartments, briefcases, or the like, or even when carrying the device in one's hand. Image processing/Computer Vision techniques can also be used to process data from image or other sensor(s) to determine a human hand was involved in actuating a button/input surface on the device. Image sensors can also continuously keep track of objects in the vicinity of the electronic device so it can be determined if hand like object was indeed sensed coming close to the device around the time of selection/actuation of a button/command/etc. This can provide information for determination of confidence (factor) that the selection/actuation was user intended. Clues can also be derived based on readings from the inertial sensors contained in the device. For example, if the device is experiencing motions that are not typical of ones experienced when user is holding the device to execute certain action (such as making a phone call, deleting contacts, sending emails, etc.), then that fact can also be used to determine/influence the confidence in tagging a particular touch/activation was indeed intentional. In another variation, if the electronic device is already experiencing non-typical motions (compared to what is expected during normal use) many of the input areas/buttons/etc. of the device can be disabled in advance for approximately the duration of time those motions persist. (The disablement can start after a time delay when the non-typical motions are initiated and continue for certain time even after the non-typical motions end.) Further, it can also be checked whether multiple button/icons/input areas/etc. are being selected/clicked/invoked simultaneously or in very quick succession to each other; as that would be another potential symptom of accidental activation. On the contrary, presence of some other factors can be used to increase the level of confidence that a particular trigger was intentional. For example, if it is detected the user is looking in a particular direction (such as towards the device) then that can give a high (possibly overriding) boost that the touch/button press/trigger was intentional. Note that image sensors (such as cameras, etc.) do not have to be active all the time and be activated within or for a short period after the touch or some trigger is detected. So, for example, if the controlled device was in sleep mode and a button was pressed/touched (e.g. "make a phone call"), the image sensor can be activated at that time to see if for example the user was looking in a specified direction to determine if the trigger was intentional. Using a combination of above checks as well as others techniques/mechanisms/sensors/etc., confidence factor(s) can be derived (to represent the chance of user intention) and then be used to either enable/disable/trigger some buttons/icons/functions/input areas/etc. on the electronic device for certain periods of time or to decide if the invocation/selection/clicking of those buttons/icons/input areas/etc. can be ignored. User feedback can also be provided to the user when their potentially inadvertent actions are ignored or are being ignored or likely to be ignored in advance of the action(s).

Some controller embodiments can monitor for time periods wherein an OMD and/or OOI motion and/or OOI position is within a specified range(s) of motion or position. Such time periods will be called as Period(s) of Limited Activity (POLA), and their time duration will be called as Duration of POLA (dPOLA). Note that POLA can include time periods where a user is being within a certain specified range of poses/positions (as measured by poses/positions of the user's body/body parts). POLAs can be included in user gestures or can be treated as user gestures by themselves. Further, POLAs can be defined on an OMD by OMD basis and/or on an OOI by OOI basis. For example, if user's head motion is one OMD and eye gaze is another OMD, the user can be performing a POLA with their head but not with their eyes/eye gaze. Furthermore, performing a POLA with an OMD does not necessarily translate into a POLA with an OOI and vice versa. As an example, if the OOI is a cursor/pointer on a computer display screen, even if it is in a POLA on the screen, that does not necessarily mean that the user's body is necessarily doing a POLA, as that is dependent on the user gesture in progress, gain curves, level of PCE/PCM, etc. Similarly, if the user's head was being used for OMD, and the content being displayed in a window on a display screen of a computer was the OOI, the OOI could be moving (scrolling) even though the head motion is within a limited range of motion since the head position (e.g. tilt angle of the head) could be driving the scrolling action at that particular point in time (again, based on the user gesture being used). POLAs can be used as ACUIs as well as Demarcators in user gestures.

Figure 13:
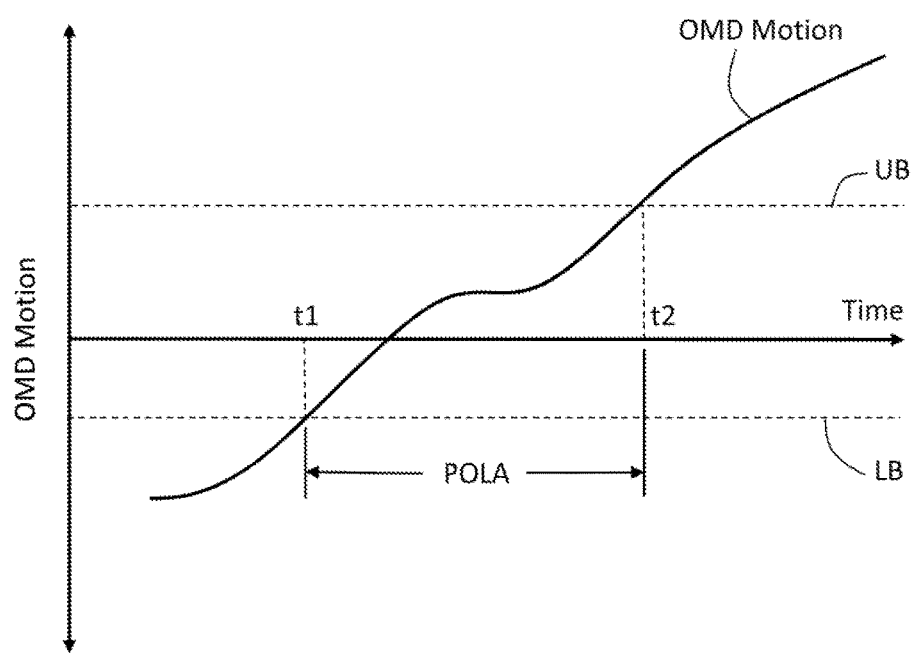
FIG. 13 shows an illustrative example of a POLA in an embodiment of the controller.

FIG. 13 shows an illustrative example of a POLA in an embodiment of a controller. In the figure, UB signifies upper bound for OMD motion magnitude and LB signifies the lower bound. Between times t1 and t2, the OMD motion falls between those bounds and therefore the time period between t1 and t2 is considered to be when that OMD is in POLA.

PCE/PCM Stickiness: FIGS. 1-4 show that OOI motion can be enabled when PCE/PCM Sensor reading is sustained beyond the Expression Threshold for a certain minimum amount of time duration (indicated by P#3). Some embodiments can employ variation of above heuristics wherein if the PCE Sensor reading is sustained for a time duration (called TIME_TO MAKE PCE STICK, designated by parameter P#13), the enabled OOI motion continues in accordance to the OMD even if PCE/PCM Sensor readings fall to back to (or crosses to be within) the PCE Expression Threshold after time t3. This means that if the PCE/PCM Sensor reading is held beyond the Expression Threshold for at least the duration of P#13 (after the start of PCE/PCM), the PCE/PCM can be considered to turn sticky i.e. it can be considered to stay active indefinitely after that point and the OOI Motion can continue in accordance to the OMD indefinitely even after the end of the PCE/PCM that started the OOI motion. (Note that value of P#13 can be set to any value greater than zero or equal to zero. For example, it could be set to be less than the value of P#3. In the embodiments discussed, for illustrative purposes, we will assume it is set to be greater than or equal to the value of P#3.) Once the PCE/PCM is turned sticky, the OOI Motion continues indefinitely even after the PCE/PCM is ended. In this state, the OOI motion can be disabled based on some other event, called the OOI Motion Disabling Event (ODE). One example of an ODE is a POLA performed by the user using a pre-specified OMD and/or by using an OOI. The POLA can use a threshold such as MOTION_NOISE_THRESHOLD or some other defined threshold on motion/position/other appropriate physical quantity. When the time duration of this POLA (dPOLA) equals or exceeds a specified minimum time duration (called as MIN_DPOLA_TO_UNSTICK_PCE, designated by parameter P#14), a sticky PCE/PCM can be unstuck (meaning that OOI Motion can be disabled). Such a POLA is addressed as an ODE POLA. Thus in this illustrative example, OOI motion is started upon a PCE/PCM initiation but ended upon an ODE POLA performed or caused by a designated body part (such as head). The ODE POLA can also be defined in terms of variance of the position of a cursor/pointer/OOI on a display screen of the controlled electronic device. ODE POLA can be also used as an ODE when eye gaze is being used as the OMD. (Note that eye gaze can be viewed as a combination of head pose/position and eyeball pose/position.) Therefore, some embodiments can have OOI motion enabled/started when user starts a PCE such as a Smile, holds that PCE for more than P#13 (to get the PCE stuck) and then continue to move the OOI (without holding the Smile/PCE) using OMD (such as head motion, eye gaze, etc.). When they are satisfied with the position/change in the OOI, they can simply bring the OMD (such as head motion, etc.) to be within the specified threshold for time duration of P#14 (i.e. perform the ODE POLA) thereby bringing the OOI Motion to an end. In an embodiment, when using eye gaze as the OMD, once the OOI motion is started and PCE is ended after it turns sticky, the user can bring the OOI Motion to end by staring (for specified amount of time) at the OOI itself or any other specified direction/area (such as simply away from the screen). In another variation when using eye gaze as OMD, Smile can be used to initiate generation of OOI Motion signals (or any other specified signals for that matter) and end generation of those signals via another PCE such as an Eye Blink.

As mentioned earlier, OOI motion can be interpreted as OOI Modification (where a particular AOI belonging to the OOI is being modified) in the above as well as following discussions. OOI Motion and OOI Modification can be used interchangeably. On the same lines, ODE can be defined as OOI Modification Disabling Event that disables/stops the modification of the OOI as part of a user gesture.

Figure 14:
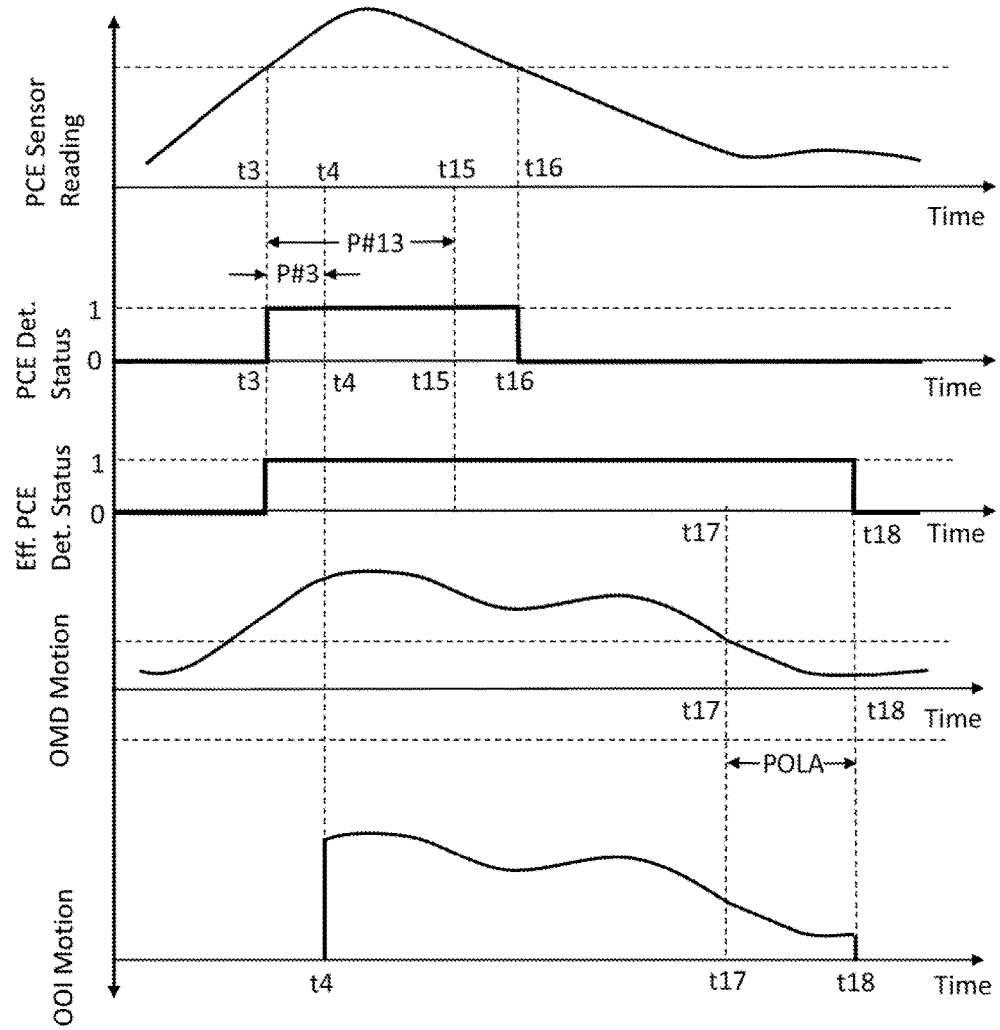
FIG. 14 depicts an illustrative example of PCE Stickiness and use of POLAs as ODE in an embodiment of the controller.

FIG. 14 depicts an illustrative example of PCE Stickiness and use of POLAs as ODE. Further, this embodiment uses the concept of Effective PCE Detection Status, which is based on the actual PCE detection status as well as the PCE Stickiness status of the PCE, which can be finally terminated by an ODE. In the figure, the PCE Sensor reading goes above the PCE threshold (depicted by a dashed line in the figure) during time period between t3-t16 and therefore the PCE detection status is indicated to be 1 during that time period (as shown by the "PCE Det. Status" curve). Parameters P#3 and P#13 are as represented. Given their definitions and explanation in this document as well as the above mentioned US patent application, it can be seen that OOI Motion begins at t4 (that is P#3 time after the start of the PCE at t3). Note that both PCE Detection Status and Effective PCE Detection Status become 1 when active PCE is detected. However, after time t15 (which is P#13 after start of PCE), the PCE turns "sticky" and therefore even after the PCE reading falls below the PCE threshold at time t16, the Effective PCE Detection Status (shown as "Eff. PCE Det. Status" in FIG. 14) continues to be 1 until the time a POLA of minimum specified duration is detected during the time period t17-t18. In this example, it is assumed that this dPOLA (of value t18 minus t17) is greater than or equal to the minimum specified dPOLA required to unstick a PCE. Therefore, when a POLA of at least that minimum specified duration is detected, the Effective PCE Status is reset from 1 to 0 at time t18. The OOI Motion (which in this embodiment is enabled and disabled by Effective PCE Detection Status) therefore comes to an end at t18.

In some embodiments, ODE can be specified to be the start or termination of a designated PCE/PCM/user gesture. Therefore, OOI motion can be enabled when a designated PCE/PCM (such as Smile, Eyebrow raise, Hand raise, etc., or a combination thereof) is started and held for at least P#13 duration, and OOI Motion can be disabled when some designated PCE/PCM/user gesture (which could be similar to the PCE/PCM/User gesture used to enable OOI Motion), is either started or terminated. In other words, in this embodiment, the user can hold a Smile for at least P#13 amount of time duration to enable OOI motion and then stop smiling (since the PCE has turned sticky after P#13 amount of time has passed after initiating the Smile), while still continuing to drive the OOI motion using their OMD. Subsequently, the user can disable OOI motion by a designated PCE such as an eyebrow raise or a PCM such as raising a hand or finger, or a combination of any PCE/PCM with or without a POLA, or even by starting a new smile as the designated the ODE. The disabling of OOI Motion can happen either right when the user gesture is started (e.g. start of a Smile/Eyebrow raise/hand or finger raise/etc.) or it can happen when the user gesture is completed (e.g. termination of the Smile/Eyebrow raise/hand or finger raise/etc.); this choice of using the start event versus termination event can be made based on user preference or system defaults or other mechanism. Further, based on the duration of the PCE/PCM/ user gesture, a Click/Select Event can also be generated (as per the Click/Select heuristics).

Some embodiments can ignore the occurrence of ODEs when the OOI Motion initiating PCE/PCM is still active (regardless of the fact if that PCE/PCM has already turned sticky). In embodiments where the ODE is different from the PCE/PCM that is designated to initiate OOI Motion heuristic (or to initiate generation of signals for some other appropriate command), it is possible that after the original PCE/PCM (that initiated the OOI Motion) has turned sticky and subsequently terminated (though still sticky), the user reinitiates the same PCE/PCM during the period of PCE stickiness. In such cases, some embodiments can ignore ODEs when they occur during the presence of the latter PCE/PCM. As an illustration, consider an embodiment where Smile is the PCE, POLA is the ODE. In this case, where the original PCE (the first Smile) that initiates the OOI Motion is terminated after turning "sticky" but the OMD is continued to be greater than the prescribed threshold (that is the ODE POLA has not occurred yet), if the user happens to reinitiate the PCE (the second Smile) and sustain it, then even if an ODE POLA occurs during this period (of the second Smile being in progress), that ODE POLA is ignored. Ignoring of the ODE POLA thereby allows continuation of the generation of the control signals (such as OOI Motion signals or others) that were started to be generated upon the first/original occurrence of the Smile/PCE. Further, such reinitiated PCEs can be used to generate different and/or additional control signals (e.g. selection signals, etc.) along with the original control signals (e.g. OOI motion signals) whose generation was initiated by the original PCE/PCM. Consider the following example embodiment that illustrates this situation. Here, the controlled device is a video gaming console, PCE is a Smile, ODE is Mouth Opening action, OMD is Head motion, and the user is playing a video game, and OOI is the graphical representation of a soldier (that is a character in the video game) and is being displayed on a display screen. In this situation, when the user initiates a first Smile the OOI Motion gets enabled, thereby the soldier (OOI) starts moving around in accordance to head motion. Once the PCE gets sticky the first Smile is terminated by the user, but the soldier continues to march in accordance to the head motion. At this point, the user can restart a new Smile (the second Smile). However, at this point, since the first Smile is still stuck, the second Smile can be used to generate different type of signals such as to fire weapons, while the head continues to provide the OMD for the soldier's motion. The firing of weapons can continue till the second Smile is terminated. However, the second Smile can also be allowed to turn sticky thereby causing the weapons to fire even after the termination of the second Smile. After this, a third Smile can be initiated to start generating signals for building a shield around the soldier. After this, if the user opens his/her mouth (thereby performing an ODE), then all the stuck Smiles can be made unstuck (meaning generation of corresponding signals can be stopped). In another variation, the stuck Smiles can be unstuck one at a time for every Mouth Open action, either in First-In-First-Out order or Last-In-First-Out order.

In another illustrative embodiment that uses the concept of PCE Stickiness, Smile is used as PCE to control generation of signals (e.g. for controlling the viewing angle in a video game) using head motion as the OMD, and Smile is (also) used as an ODE. The user can start controlling the viewing angle by initiating a smile and holding until it turns sticky. After this point in time, the viewing angle continues to be controlled based on head motion even if the user has stopped smiling. This viewing angle control can continue until the point in time when the user initiates another Smile (which is also the prescribed ODE). The viewing angle control can be made to stop when this ODE (Smile) is actually started; or started and sustained for certain amount of time; or started and sustained for specific amount of time and terminated; or started and terminated (without regards to how long it was sustained).

Figure 15:
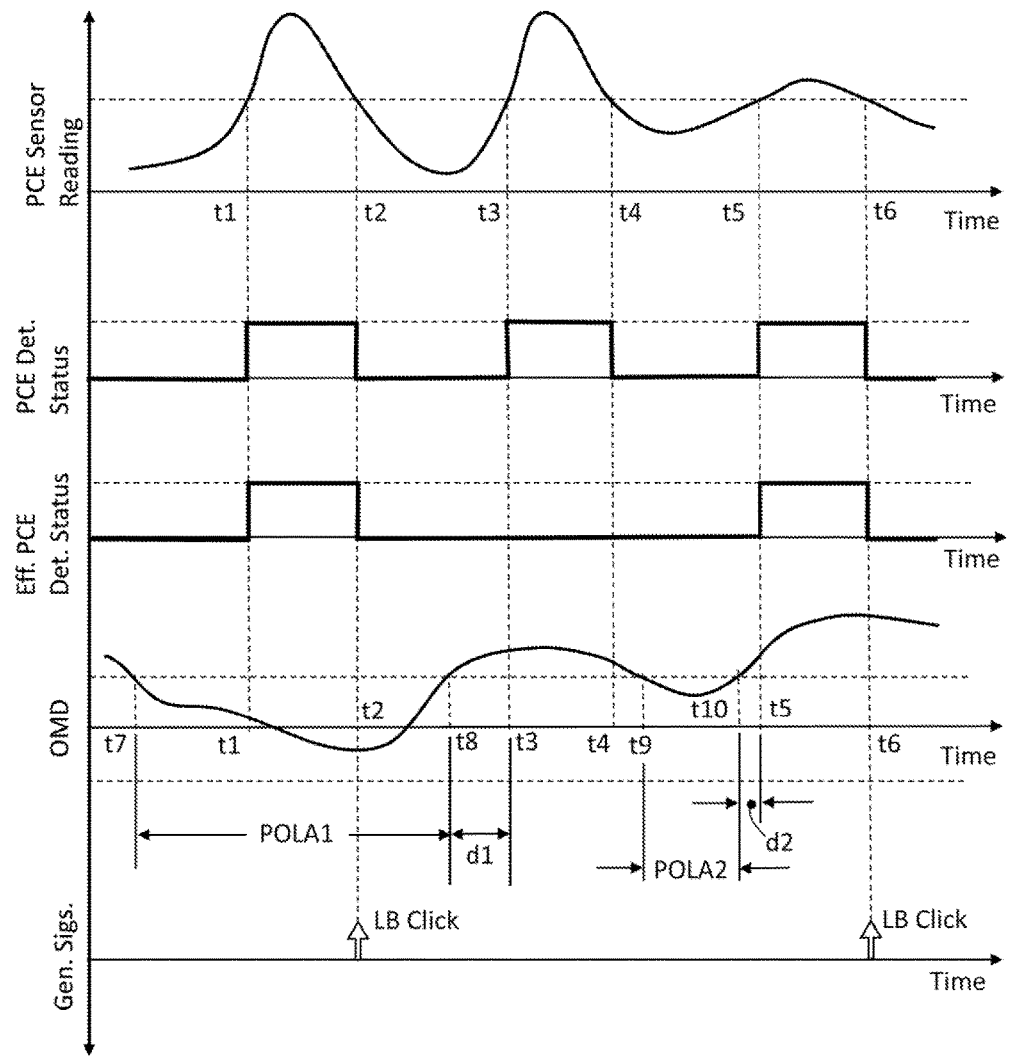
FIG. 15 shows an illustrative depiction of an embodiment using POLA as a mechanism for detecting user intent.

FIG. 15 shows an illustrative depiction of an embodiment using POLA as a mechanism for detecting user intent. In this embodiment, the user is required to old their designated body part (such as head) steady for at least a specified amount of time thereby performing a POLA of minimum time duration no more than a specified max lead time before performing a Smile (an illustrative PCE). The figure shows two POLAs being performed. The first active smile (detected between t1 through t2) is accepted as it is preceded by a POLA of minimum duration. The third smile (during t5 through t6) is shown to be preceded by a POLA d2 milliseconds before the start of smile at t5. In this illustration d2 is less than the max lead time, therefore that Smile is also allowed/accepted as user intentional. However, the smile that last between t3 though t4 does occurs d1 milliseconds before t3, which happens to be more than the max lead time and therefore is not considered to be a user intended smile. Thus, the generated signals ("Gen. Sigs." In the figure) shows LB Click signals being generated only for the first and third smiles (assuming that those smiles have durations that are within the requisite bounds to generate a selection signal).

Additional Indications of User Intent: Some embodiments can require the user to perform "certain actions" (including performing motions/expression/user gestures and/or being in certain ranges of positions/poses) as an indication/additional confirmation of user intent. Only when these "certain actions" are performed that other actions being performed concurrently or subsequently can be interpreted as intentionally performed by the user (for the purpose of generating signals for communication with the controlled device). For example, some embodiments can require additional actions on the part of the user for the enabling OOI motion, beyond what was described in OOI Motion heuristics. In one variation, holding the head/body part in a particular pose or range of poses (for example in a frontal pose where the head pose angles and/or translational position is within certain degrees and/or inches from the perfectly centered position or some other designated position) can be required in addition to performing a PCE/PCM as described in the OOI Motion heuristics. In such variations, if the user initiates a PCE/PCM while in a non-frontal pose, that PCE/PCM can be ignored by the system and thereby no control signals will be generated. The control signals (such as OOI motion signals) can be generated only when PCE/PCM is initiated in a frontal pose. Other such variations can also allow generation of signals even if the user initiates the PCE/PCM outside the frontal pose, but start that generation only when the user transitions into a frontal pose and optionally stop that generation of signals when the user transitions out of the frontal pose. In another example where the PCE is a Smile and the OMD is eye gaze (position/motion), the PCE can be ignored unless the user's eye gaze was pointed in a certain direction (absolute or in relation to the user or controlled electronic device or some object in the environment the user is currently in), or is within a desired range of OMD poses so as to recognize/accept the PCE/PCM for the purpose of initiation of generation of control signals. Some variations can employ multiple OMDs for multiple purposes. For example, some embodiments can employ eye gaze as the OMD to locate a cursor on the display screen of an electronic device, but use head motion as the OMD for indicating user intent. Therefore, for example, they may require the user to hold their head in a specified range of poses (to indicate frontal pose) before they will process a PCE to start generation of OOI Motion or other signals in correspondence to the eye gaze. Other embodiments can totally do away with the need for a PCE/PCM for enabling OOI motion, and only require the head/body part's pose (i.e. angular orientation and translational position) be within a specified range for a specified amount of time (such as P#13) before the OOI Motion is enabled. For example, a user can enable the OOI motion by simply holding their head within certain range of pose/position (e.g. look straight at camera from the front of the camera so that Roll/Yaw/Pitch of the pose of the user's head is within +/−10 degrees and not more than 6 inches off from the center in the Y or Z axes) for a specified time (e.g. 1000 milliseconds) to enable the OOI Motion (and drive it possibly by eye gaze or any other mechanism), which can later be terminated by any of the specified ODEs. Note that ODEs can also be based on pose/position of a body part, for example, holding the head in a non-frontal pose, finger raised at more than 45 degree angle, opening mouth by at least 25%, etc.

A variety of feedback can be given to the user in regards to their being in an OOI motion enabling pose/position and the amount of time elapsed/remaining before the OOI Motion is actually enabled. Such feedback can be visual, auditory, haptic, olfactory or any other suitable mechanism. In general, feedback can also be provided on any/all aspects of various concepts and components (such as PCE, PCM, OMDs, ODEs, etc.) used in interaction with electronic devices. Visual feedback can include indicators (audio, visual, physical, virtual, etc.), progress meters, change in shape/size/color/texture/behavior/etc. of graphical objects, creation/deletion/animation of graphical objects (based on the state, amount, direction or any other property of PCE, PCM, OMD, ODE, etc.) As an illustration, when a PCE or PCM is initiated a sound signal can be generated as an indicator of that fact. A graphical icon can also be displayed on a display associated with the electronic device or an existing graphical icon can be changed in appearance when a PCE/PCM is initiated. Further, as the PCE/PCM progresses, the sound signals can change and/or the graphical objects can change to provide an indication of the amount of time passed since the initiation of PCE/PCM, the level/ amount/direction of PCE/PCM, as well as feedback can also be provided on the OMD itself. The indicators can provide an indication of progress towards the upcoming time milestones/thresholds. For example, once the PCE/PCM is initiated, the indicators can provide an indication on the how much time remains before a time duration threshold is reached, wherein meeting the time threshold results in generation of signals that are different from signals that are generated when the time threshold is not met.

Body motions such as head nods, hand waves, etc. can be used as part of user gestures that are used to communicate with or control electronic devices. However, humans can perform such motions/actions in natural day-to-day living without the intention of controlling or communicating with electronic devices. PCEs/PCMs can be used to convey user intent of interpreting certain designated body motions as user gestures meant to communicate with/control an electronic device. In other words, certain PCE/PCMs/gestures can be used to confirm user intent in communicating with electronic devices. For example, if nodding the head down is the specified user gesture to cause "Page Down" action on a computing device, then the controller can be made to process those body motions/user gesture only when the user is also performing a PCE/PCM (such as Smiling or Raising a Hand or Raise Eyebrow(s), etc.). Therefore, when in front of an electronic device, to cause a "Page Down" command, the user has to not only nod their head but also perform a designated PCE/PCM (such as Raise Eyebrow) at the same time. Further, the concept of PCE/PCM stickiness can also be used here. In such cases, the user could perform the PCE/PCM for a certain minimum amount of time (which can be defined by P#13) and then subsequent motions can be treated as user gestures performed with intention of communicating with or controlling an electronic device, until the point when the user performs a designated ODE (such as a POLA or some other specified gesture). Certain PCE/PCMs (or combinations thereof) can thereby be used to enable or disable recognition of other user gestures and/or translation/ use of these other user gestures to cause communication with or control of electronic devices.

POLAs can be used as additional indicators of user intent when performing other user gestures. Some embodiments can require a POLA (of a certain specified minimum and/or maximum time duration) to immediately precede a user gesture. In that case, for example, for a head nod gesture to be recognized as a head nod gesture meant to communicate with an electronic devices (versus just some head nod performed while listening to music with no intention of communicating with an electronic device), then the control system can require that a head nod gesture be immediately preceded by a POLA (possibly with designated required minimum and/or maximum duration) performed by the user, using head motion. In other words, the user can be required to hold their head still for a specified minimum amount of time before performing the head nod, for that head nod to be recognized as an intentional head nod. This can allow the user (and the system) to distinguish user gestures that were performed with deliberate intent of communicating with electronic devices from those that were not. Similar requirements can be made when using POLAs that use pose/ position for distinguishing whether certain user gestures are deliberate or user intended. So for example, a head nod gesture may not be recognized/qualified to generate control signals if it was not immediately preceded by the user being within a specified range of head position/poses. An example of this situation can be when the user's head motions are being monitored by a webcam on a smart phone. The user can be required to look in the direction of the smart phone within certain bounds of deviation from a perfectly frontal pose for a certain amount of time just before performing the head nod. Similarly, for example, a Click gesture (using a PCE/PCM) may not be recognized as a user intended Click gesture if it was not preceded by a specified POLA, possibly with a specified minimum and/or maximum limits on the duration of the POLA. As an example of this variation, if the PCE is a Smile and the OMD is head motion, then to generate a click signal as per the Selection Heuristics (as described in the above mentioned patent application), the user can be required to hold their head steady for a prescribed amount of time either immediately or within a certain time duration before starting to perform the smile. The OOI Motion heuristics can also be similarly modified to include a POLA before the PCE is initiated. Similarly, any gesture can require specific POLAs, with or without time bounds, for the purpose of recognizing/processing those gestures.

The concept of looking for some user controllable quantity to be within range (for the purpose of establishing user intent) can be extended to use other physical quantities. Some examples of other physical quantities are sound (vocal or otherwise), intensity of touch/pressure, brain waves, attention/meditation levels, rate of breathing, depth of breathing, tensing of muscles, holding of breath, crossing of eyes, etc. Therefore, for example, a head nod performed by the user may not be recognized or translated into control signals unless the user, for example, is holding their breath or have certain level of attention/meditation (that can be measured by brain waves), muscles of certain specified body parts be tensed or relaxed to a specified level or within range of level, etc.

Some heuristics can use variable time duration requirements for a POLA occurring within a user gesture. For example, when the same user gesture (containing a certain POLA) is performed at different times/under different conditions, the POLAs within that gesture can be specified to have differing time duration requirements under those differing conditions. This is because dPOLA can be specified to be dependent on a physical quantity. For example, the time duration requirement for a POLA in an ODE POLA can be dependent on the speed/magnitude and/or direction of OMD, and/or the location of the OOI at or preceding or during the time the ODE is being performed. For example, the time duration requirement can be longer if the OMD motion magnitude/variation preceding the POLA was steady and/or low, versus if the speed of motion was reducing drastically. This is because the faster reduction in OMD may indicate the user's intent on coming to a standstill much faster, and therefore the required time duration for the POLA can be shorter. In another example, if OMD was head motion, and the OOI was in the upper area of the display screen, the time duration can be made shorter (compared with lower areas of the screen). (The position of the OOI can be determined by the head pose or other techniques.) Such behavior can provide more user comfort as it can be more work for a user to hold a body part such as a head higher versus lower. Similarly, in another variation, the time duration can be made dependent on the amount of distance the OOI has traveled in a particular direction (during that particular OOI motion command). Again, the time duration can be shortened as the OOI travels upwards, or if it is sensed that the user has moved their head close to the boundaries of range of comfortable head poses. Such system behavior can be application specific and the heuristics of determining time duration can be changed according to the needs of the application. For example, if the application was a game designed to give exercise to user's neck muscles, the time duration heuristics can be reverse of what was discussed above (e.g. they could make the duration longer when user is in head poses that are difficult to maintain).

Some embodiments can use multiple OMDs independently or simultaneously or in close conjunction. These OMDs can be provided by different body parts. Each of these OMDs can have their own parameters, gain curves, PCE/PCMs and other settings. As an illustrative example, both eye gaze direction and head motion can be used together to drive OOI motion. Based on the presence of a PCE/PCM, the OOI can move in accordance to the eye gaze as well as head motion. Therefore, if the designated PCE was a Smile, upon start of a Smile the OOI can start moving following the eye gaze as well as the head motion simultaneously. (In a variation, conditional OMD activations can also be defined; for example, head motion information can be used to drive OOI motion only when eye gaze is held relatively steady, that is within designated bounds. Thresholds on eye gaze motion and/or head motion can also be defined above or below which the OOI can move accordance to eye gaze versus head motion/orientation. For example, if eye gaze changes by more than a threshold of 20 degrees in a certain time period, the OOI can move in accordance to eye gaze; or else it can move in accordance to head motion. Blending functions can also be used to determine the amount of influence OMDs can have on OOI motion. In further variation, gain curves and other parameters can be set such that motions of head cause fine motions of the OOI (which can be achieved by using flatter gain curves), whereas the OOI is made to follow the eye gaze in a more responsive fashion for larger eye gaze motions. In effect, the eye gaze direction can be used for quick/large motions of the OOI but the finer motion control can be achieved by using head motion. Such an approach can allow achieving finer and more precise OOI motion control even when eye gaze may not be tracked to a high level of accuracy. (Fine eyeball motions can be harder to track/measure especially using general-purpose optical sensors such as webcams, compared to tracking the large body parts such as the head).

Figure 16:
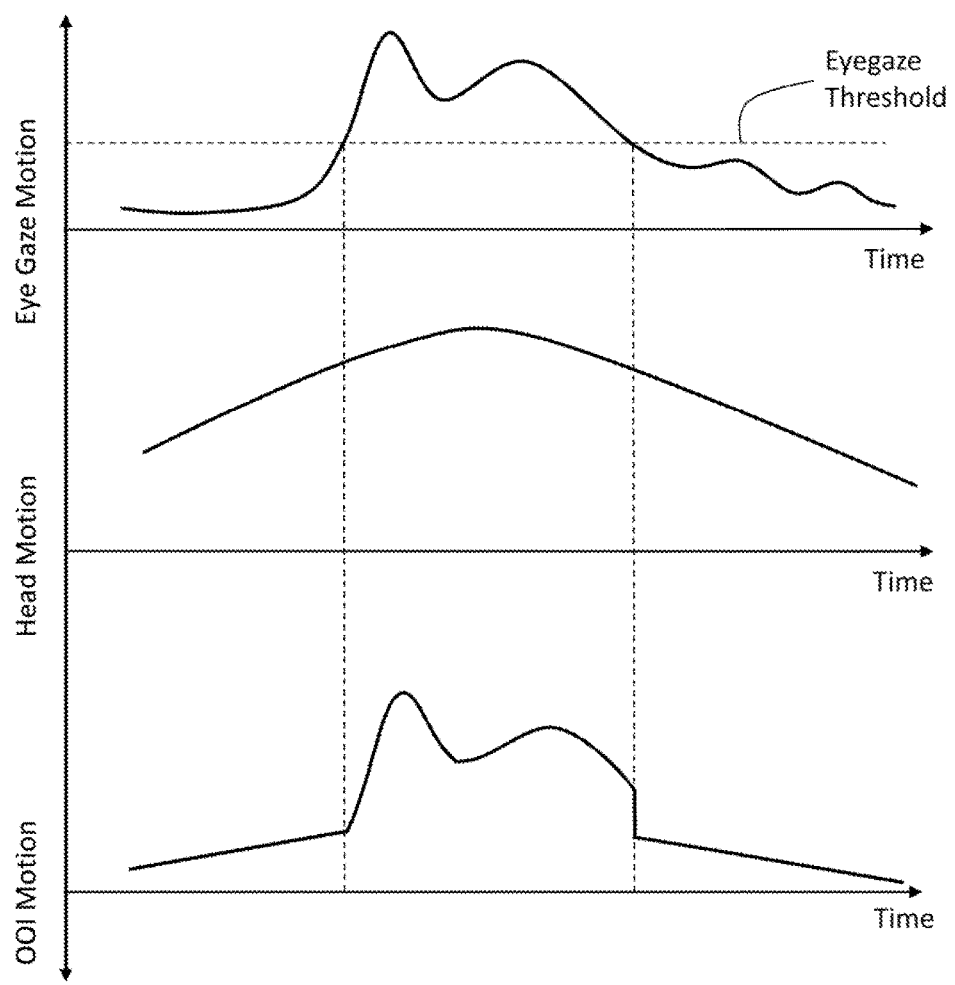
FIG. 16 shows an exemplary illustration of an embodiment when the OOI motion is dependent on both the Eye gaze as well as Head motion as the OMD.

FIG. 16 shows an exemplary illustration of an embodiment when the OOI motion is dependent on both the Eye gaze as well as Head motion as the OMD. The OOI Motion is shown to be in accordance to head motion before the Eye gaze motion exceeds the threshold, after which it is in accordance to the Eye Gaze motion and after the Eye gaze motion falls within the threshold, the OOI motion reverts back to be in accordance to the head motion. In a variation, instead of instantaneous velocity of eye gaze, the amount of displacement experienced by eye gaze over a specified amount of time can be used to be monitored against a displacement threshold. This time duration (during which eye gaze displacement is accumulated) can be specified to start 'n' milliseconds before the instant when the measurement/comparison is done. People knowledgeable in the art can see that many such variations can be created while using the base underlying principle of using two OMDs driving the OOI motion.

Further variations can use different PCE/PCMs with different OMDs. So, for example, the OOI motion can be enabled via the Eyebrow Raise PCE when using Eye Gaze/ Eyeball motion as the OMD, whereas a Smile or a Jaw Drop PCE can be used to enable OOI motion when using Head Motion as the OMD. Therefore, in this illustrative example, the OOI does not move in accordance to eye gaze until the user raises one/both eyebrows and then looks in the direction of the final destination of the OOI. Then, the user can lower their eye brow(s) to the normal position and then start smiling to move the OOI in accordance to their head motion. The head motion can be made to move the OOI at a much slower rate, thereby allowing for much more precise OOI movement/location than is possible by eye gaze tracking alone. Note that in other variations, both/multiple OMDs can be used simultaneously while using a common PCE. It will be obvious to people knowledgeable in the art that many more variations are possible by using different types of PCEs/PCMs, OMDs and combinations thereof, different set of parameters, gain curves as well as conditions for usage/activation of the OMDs.

Heuristics for POLA based Multi-Command—Some embodiments can generate signals for multiple commands of different types based on a duration of a POLA performed as part of a user gesture. For that purpose, they can define and use parameters to specify various time requirements (bounds) of a POLA performed following the start or end of a PCE (or a combination of PCEs), or when the PCE(s) simply reaches or crosses specified threshold(s). Each of these parameters can correspond to particular command signal(s) that can be generated based on the performance of the POLA in accordance to the time bound value specified by that parameter. In one embodiment, parameters 15, 16, 17 and 18 (designated as P#15, P#16, P#17 and P#18) can be defined to specify time bounds on a POLA performed after a PCE is initiated. This embodiment of POLA based Multi-command heuristics defines & uses the following parameters—

1. P#15 is MIN_DPOLA_FOR_OPTIONS, which is the minimum time the user needs to cause/perform a POLA in order to invoke an Options Menu (or Options Window or any other Command Menu/Window).
2. P#16 is MIN_DPOLA_FOR_SCROLL, which is the minimum time the user needs to cause/perform a POLA in order to invoke the "Scroll" command.
3. P#17 is MIN_DPOLA_FOR_CLICK_AND_DRAG, which is the minimum time the user needs to cause/perform a POLA in order to invoke the "Click and Drag" command.
4. P#18 is MIN_DPOLA_FOR_RIGHT_CLICK, which is the minimum time the user needs to cause/perform a POLA in order to invoke the "Right Click" command.

Figure 6:
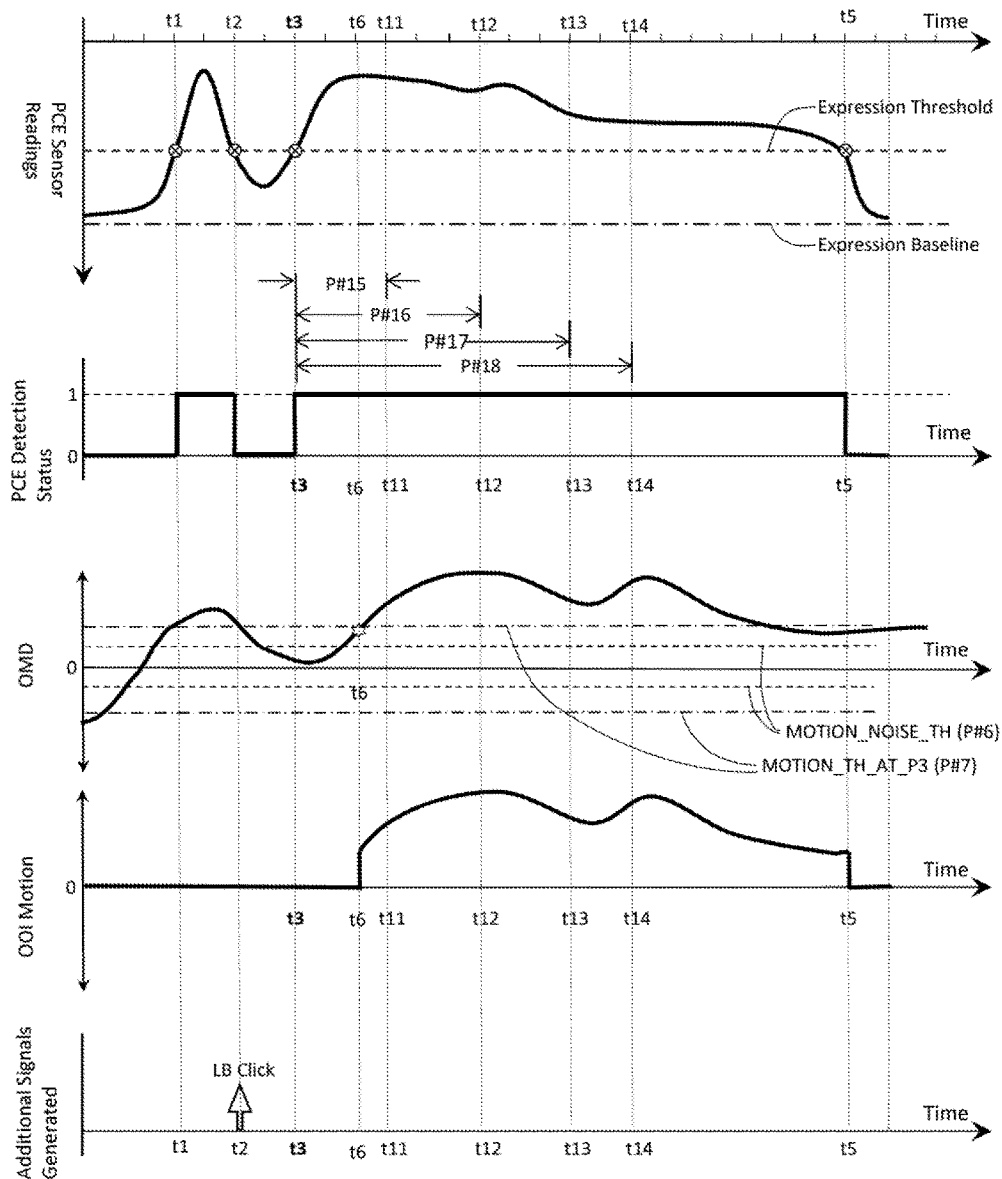
FIG. 6 shows an example of Heuristics of POLA based Multi-Command gesture in an embodiment of the Controller—Part 1.

Given the above parameter definitions, and their values (as depicted in FIG. 6), P#15, P#16, P#17 and P#18 can be viewed as forming a chain (an ordered list) of "minimum dPOLA" parameters used to gauge the duration of the POLA caused/performed by the user immediately following reaching/crossing a threshold by a PCE. (Note that as depicted in FIG. 6, this embodiment uses the same threshold (P#7) for each of the POLA. However, other embodiments can define additional parameters to specify a different threshold value for each of the time segments t3:t11, t11:t12, t12:t13, t13:t14 and t14:t5.) In this embodiment, if the duration of the POLA (performed starting at time t3, that is the time of initiation of a PCE) is—

>=0 and <P#15—Signals for OOI Motion can be generated starting at or after the time when OMD reaches or crosses a specified threshold (such as P#7). In this embodiment, this happens at time t6. The generated OOI motion signals are in accordance to the OMD. See FIG. 6. Note that in some embodiments, the Motion Noise Threshold is deducted from the OMD before computing OOI Motion, whereas other variations do not.

Figure 7:
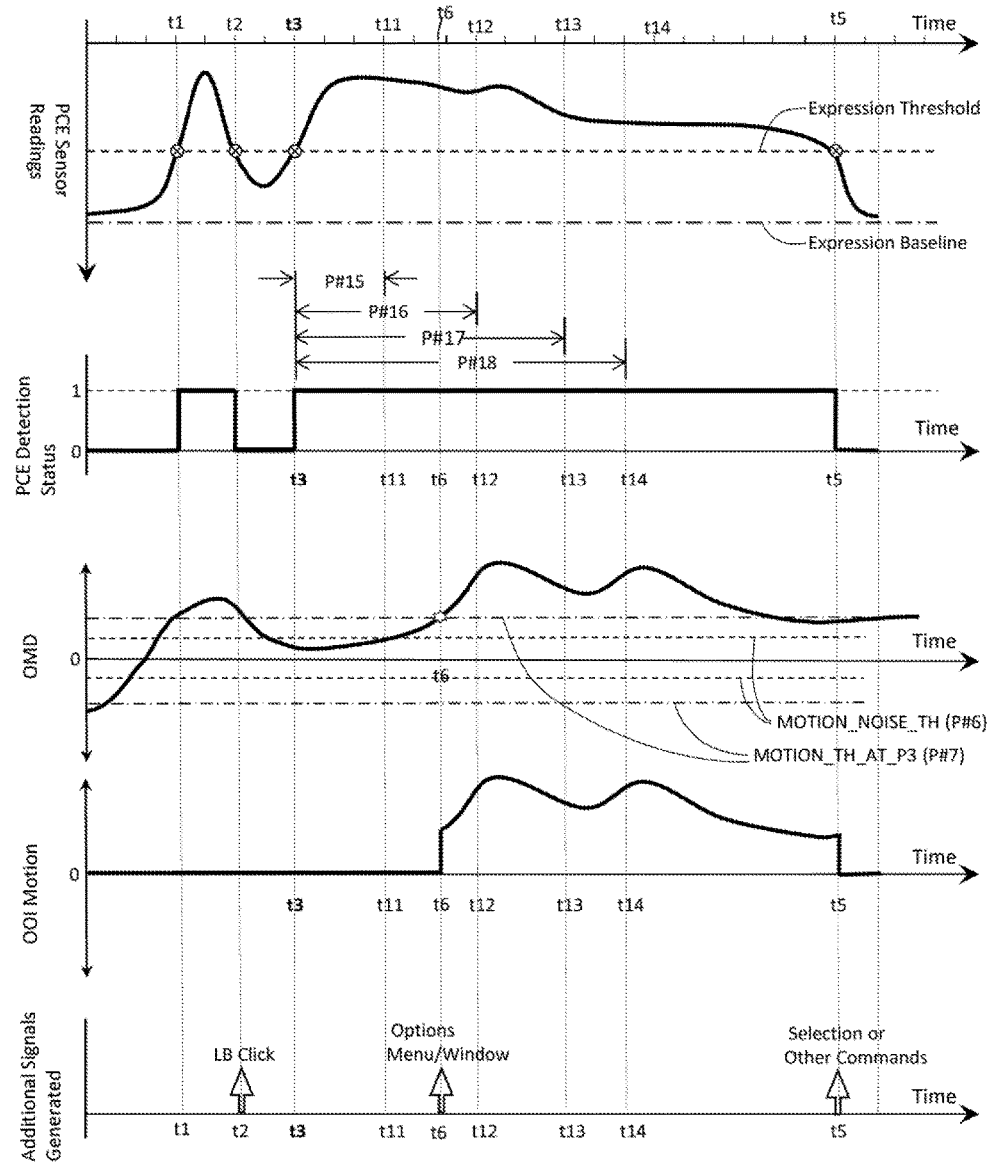
FIG. 7 shows an example of Heuristics of POLA based Multi-Command gesture in an embodiment of the Controller—Part 2.

>=P#15 (MIN_DPOLA_FOR_OPTIONS) and <P#16— See FIG. 7. Signals for displaying Options Menu or Window can be generated when OMD reaches or crosses a specified threshold (such as P#7). In this embodiment, this happens at time t6. (See FIG. 8 for an embodiment of an Options Menu that can be displayed at or after time t6). Further, signals for OOI Motion can also be generated (starting at or after time t6) wherein the OOI motion is based on the OMD. Thus the user can navigate the OOI (such as a pointer) to a particular location/area on the display Options Menu/Window.

Figure 8:
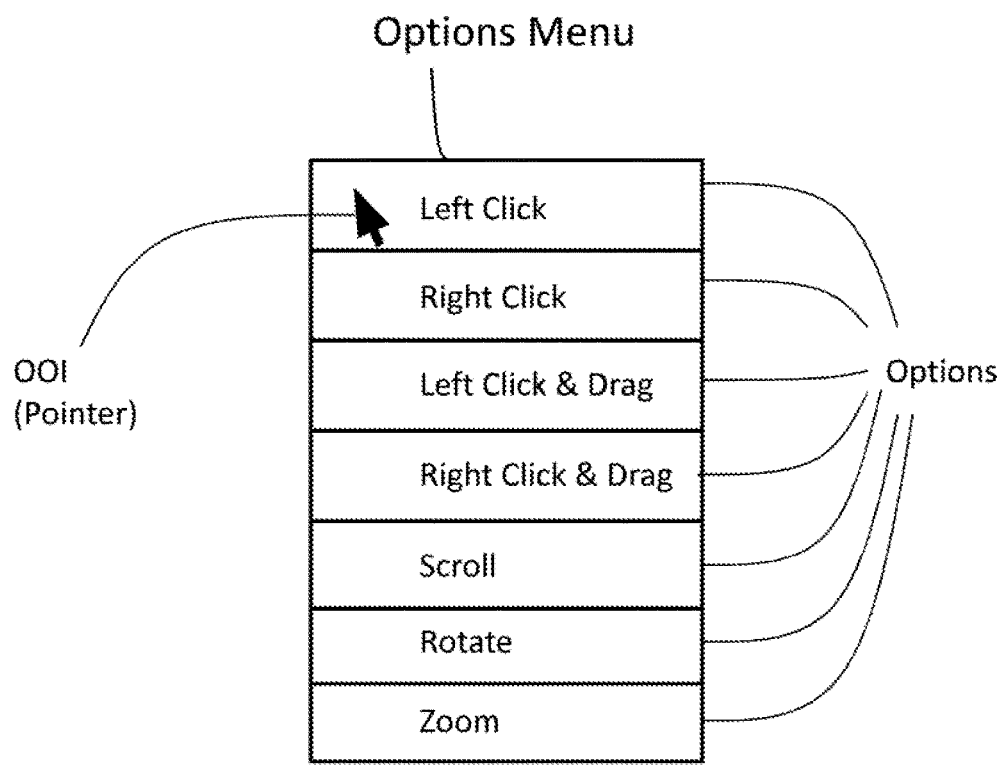
FIG. 8 shows an example Options Menu in an example of Heuristics of POLA based Multi-Command gesture in an embodiment of the Controller.
Figure 9:
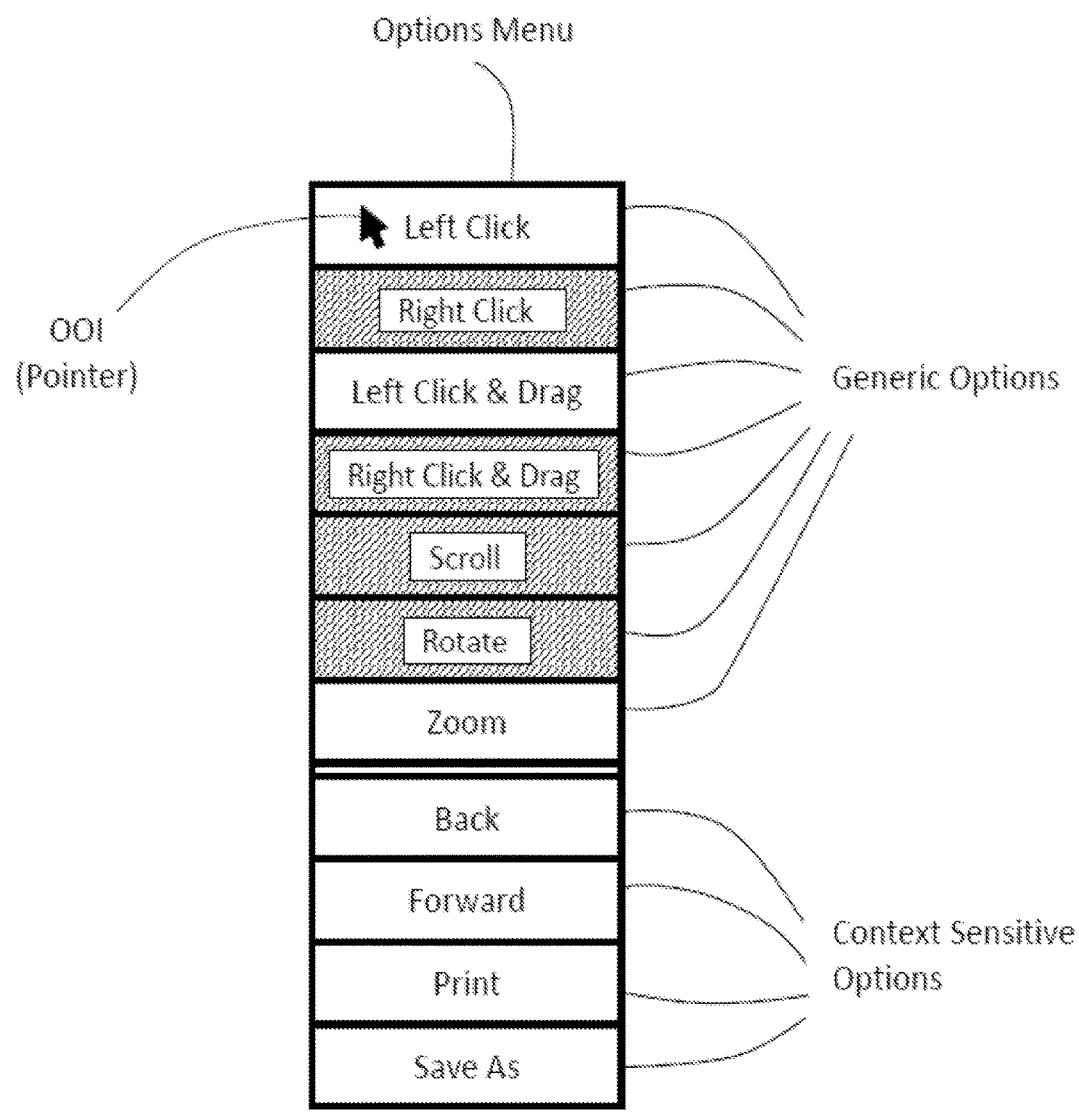
FIG. 9 shows another example Options Menu in an example of Heuristics of POLA based Multi-Command gesture in an embodiment of the Controller.

Additional signals can be generated at end of the PCE (at or after time t5). One example of an additional signal is a selection signal that can lead to making a selection from the displayed Options Menu/Window (based on the position of the OOI). In this way, Options Menu/Window can provide a convenient way for the user to select from a variety of commands to execute. In one variation, Selection or other command signals can also be generated when user performs POLAs of a specified (minimum and/or maximum) durations subsequent to t6 and/or the display of the Options Menu/Window but before t5 (the end of PCE) and/or before an ODE (if the PCE has turned sticky). Note that the Options Menu in FIG. 8 depicts one embodiment of a list of generic commands that can be invoked from the controller. This list can be augmented by context sensitive commands based on state of the controlled device and/or the position of the OOI on the controlled device. For example, if the OOI is a pointer and the controlled device is a computer, then some or all of the commands (displayed by the operating system of the computer) in the "secondary menu" (normally obtainable by right clicking at that pointer location) can be included in the list of context sensitive options on the Options Menu. For example, if the pointer is currently on a web browser window, then depending on the exact location of the pointer, additional options (such as "Back", "Forward", "Print", "Save As", etc.) can be also included in the list of options in the Options Menu. Further, the state of the computer (operating system) and/or location of the pointer/OOI can also affect the list of generic options displayed in the Options Menu. For example, in the case of the pointer being on the title bar of the web browser window, some options such as "Rotate" may be dropped or rendered inactive on the Options Menu or the list of options could be rearranged to push such options lower on the list. See FIG. 9 for an embodiment of Options Menu showing some generic options as well as some context sensitive options, with some options rendered inactive by graying them out. It should be obvious to persons knowledgeable in the art that amongst other things, the list of commands in the generic as well as the context sensitive part of the options menu/window, the structure, organization, display as well as the mechanics of the operation of Options Menu/Window can be varied and/or combined to create multitude of embodiments, while still using the concepts, principles and heuristics mentioned in this document. The embodiments discussed in this document are only illustrative examples.

Figure 10:
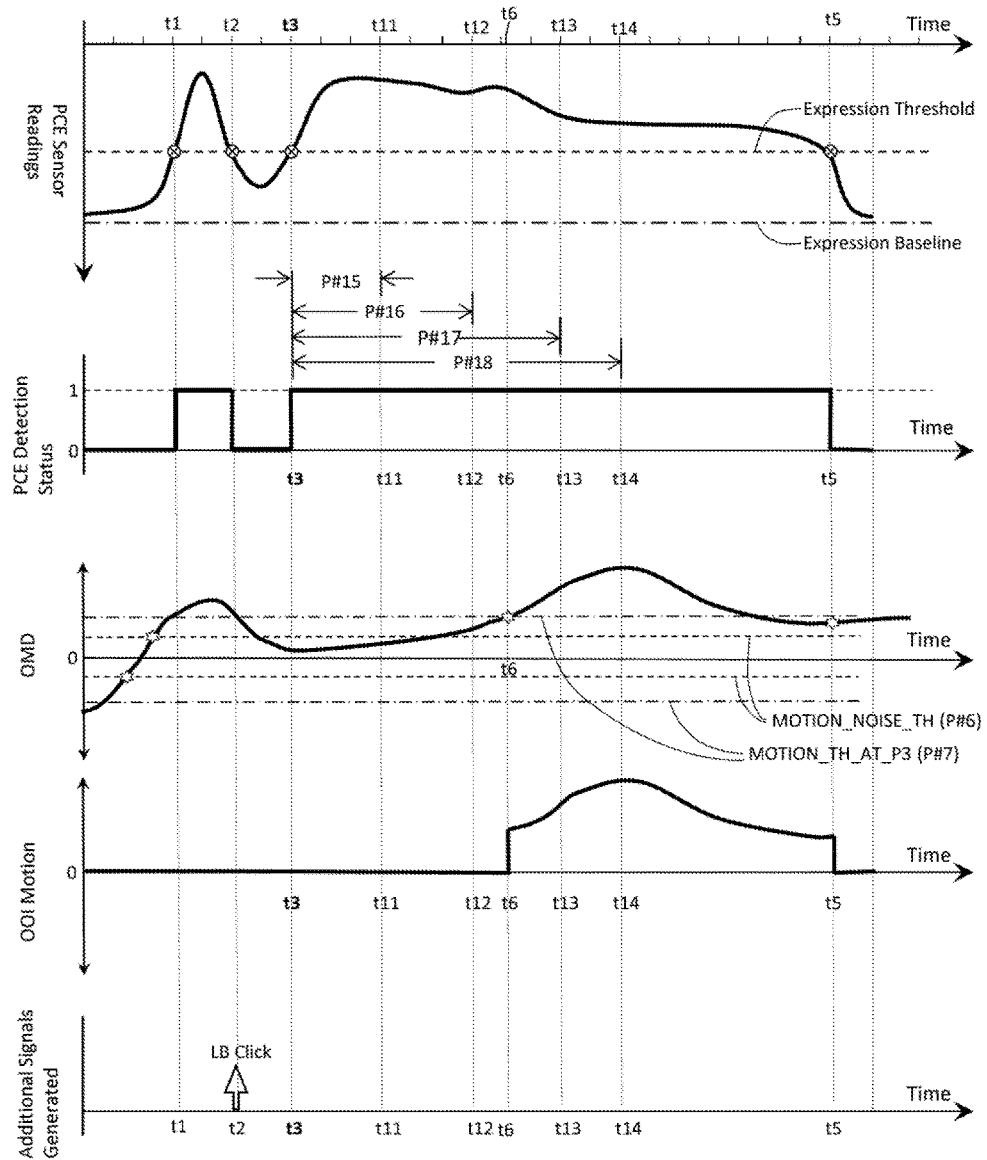
FIG. 10 shows an example of Heuristics of POLA based Multi-Command gesture in an embodiment of the Controller—Part 3.

>=P#16 (MIN_DPOLA_FOR_SCROLL) and <P#17— Signals for Scrolling the currently selected/active Window or graphical or object or input mechanism on the controlled electronic device can be generated in accordance to the OMD (see FIG. 10). The signal generation can start at time t6 (that is when the OMD reaches or crosses the P#7 threshold for the first time after t3). Note that FIG. 10 does not explicitly identify Scrolling signals as such, as in this situation, the content in the displayed Window or the scrollbar of the Window itself is considered the OOI, and the OOI Motion graph represents the generated Scrolling signals. In other variations, scrolling can be replaced with other commands including those that can utilize OMD, e.g. Rotation signals for the current OOI (such as a graphical 2D or 3D Model, etc.). The generated command signals can be in accordance to the OMD and can be stopped when the PCE/PCM is terminated.

Figure 11:
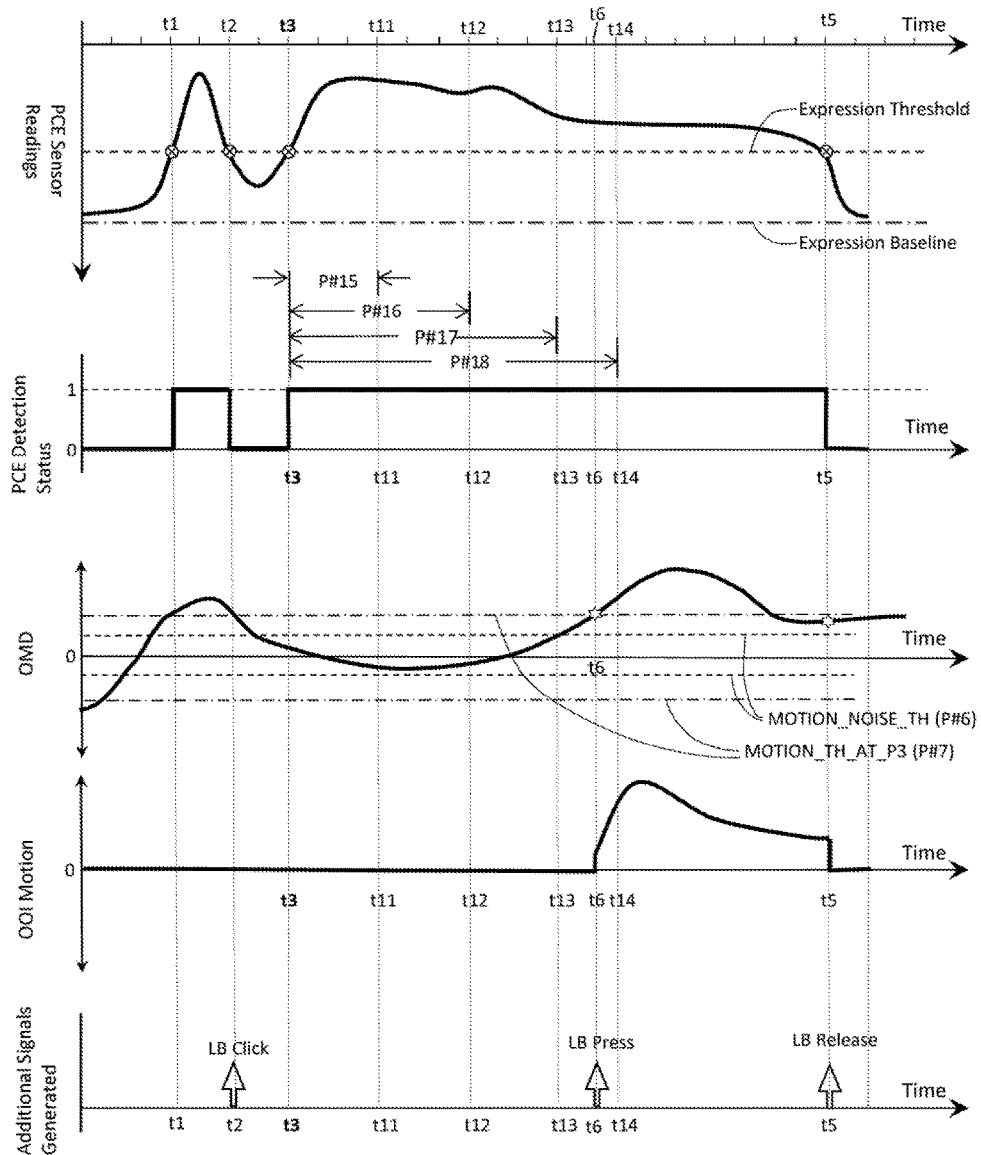
FIG. 11 shows an example of Heuristics of POLA based Multi-Command gesture in an embodiment of the Controller—Part 4.

>=P#17 (MIN_DPOLA_FOR_CLICK_AND_DRAG) and <P#18—Signals for "Click and Drag" command can be generated when OMD reaches or crosses a specified threshold (such as P#7). In this embodiment, this happens starting at time t6. This can include first generating a LB Press signal at the end of the POLA (that is at time t6). This can also include generating signals for OOI motion starting t6 until time t5 when the PCE ends. Further, LB Release signal can also be generated at or after the PCE is ended (time t5). (See FIG. 11.)

Figure 12:
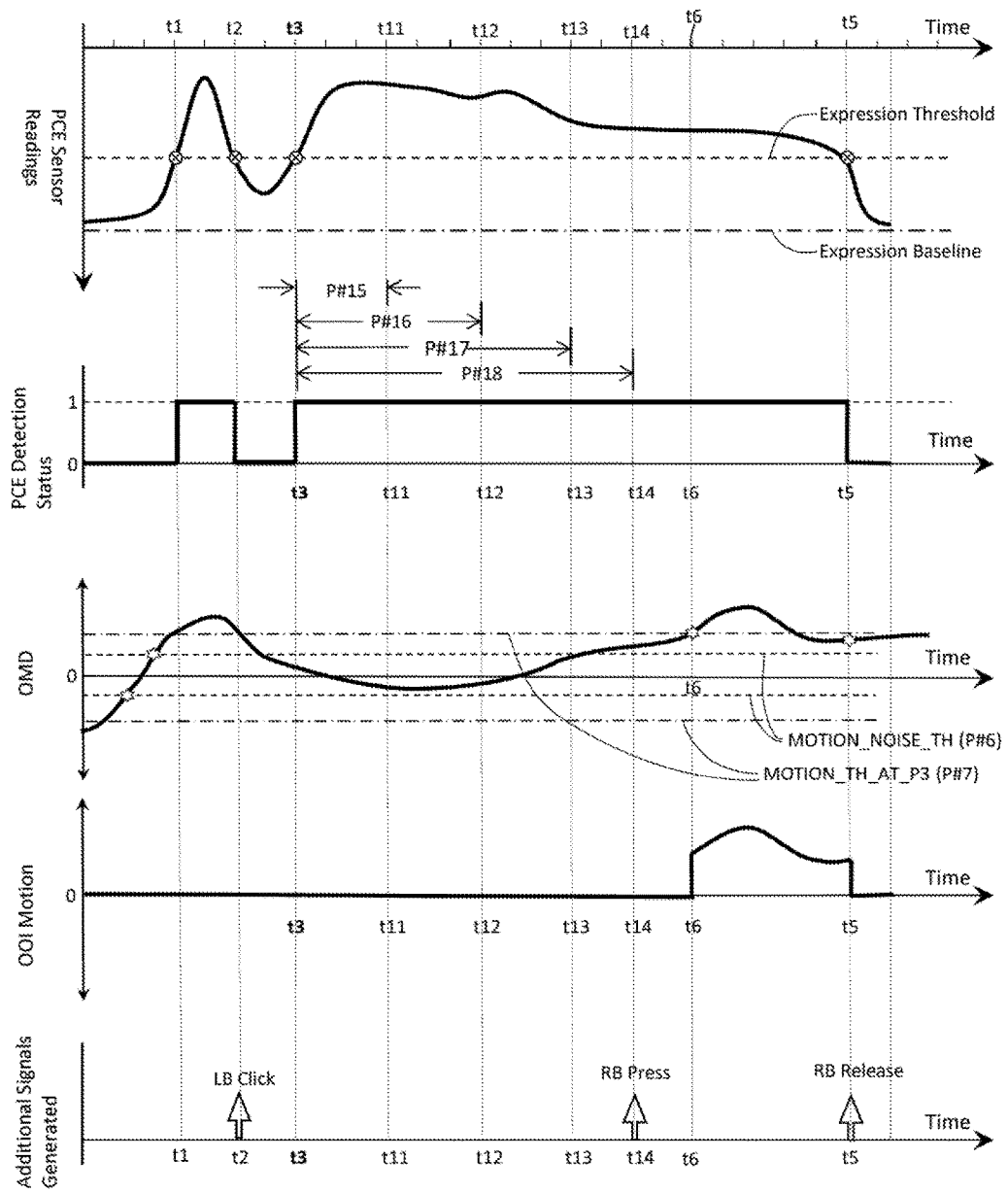
FIG. 12 shows an example of Heuristics of POLA based Multi-Command gesture in an embodiment of the Controller—Part 5.

>=P#18 (MIN_DPOLA_FOR_RIGHT_CLICK)—Signals for Right Button (RB) Press can be generated at time t13 and RB Release can be generated at time t5 (when the PCE is ended by the user). OOI motion signals can be generated starting time t6 (that is when the PCE reaches/crosses the P#7 threshold) as shown in FIG. 12. In another variation, given that P#17 is the last in the chain of minimum dPOLA parameters in this embodiment, the RB Press signal can be generated right at t14 and OOI motion signals can be started as soon t14 as well (subject to OMD being greater than P#6 threshold) and up until the end of PCE.

A multitude of embodiments of heuristics based on a chain of dPOLA parameters can be created by using different types of signals to be generated corresponding to each parameter, different values for each minimum dPOLA, different number of parameters as well as the order of the parameters. Though the concept of "sticky PCE" was not explicitly utilized, it can also be used in conjunction with the concept/heuristics of chained dPOLA parameters. In fact, any concepts/principles/heuristics can be combined to generate multitude of additional embodiments.

As mentioned in the above-mentioned US patent application, any of the commands (listed above or otherwise) can have different results on different electronic devices. While in some of the above embodiments the controller generates signals for consumption by a computer, other embodiments can generate signals for other electronics devices including tablets, smart phones, home media centers, washing machines, microwave ovens, smart TVs, medical/industrial equipment, etc.; thereby, the interpretation and result of each of the commands can be different for those devices although the concepts/principles/heuristics for generating those commands are the same. One example of this situation is using the Selection heuristic when controlling different types of devices can result in different command signals. When controlling a laptop, the selection command may generate a left mouse button click signal. However, when controlling a tablet or smart phone, the same Selection heuristic may generate a touch signal. Similarly, a selection command on an entertainment system may actually be a button press command signal and so on.

It will be obvious to persons knowledgeable in the art that the principles and heuristics described herein can be used regardless of the method/type of sensors/hardware/algorithms used to detect and measure body motions, facial expressions, facial muscle movement, or other user actions that can be used as PCEs/PCMs/OMDs/ODEs independently or in conjunction with others. These principles and heuristics can also be employed to generate different and/or additional control signals (and their combinations) compared to the control signals (and their combinations) mentioned in this and above mentioned document(s). Various concepts/principles described can be combined together to obtain multitude of variations/embodiments.

The invention can be implemented in software, hardware or a combination of hardware and software. The invention can also be embodied as computer readable code on a computer readable medium. The computer readable medium is any data storage device that can store data which can thereafter be read by an electronic device. Examples of the computer readable medium include read-only memory, random-access memory, CD-ROMs, DVDs, magnetic tape, USB sticks, and optical data storage devices. The computer readable medium can also be distributed over network-coupled computer systems so that the computer readable code is stored and executed in a distributed fashion. While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

I claim:

1. A system for a user to control an electronic device, the system comprising:
   a microprocessor configured to:
   receive head signals indicative of at least one of motion and position of the user's head;
   receive eye gaze signals indicative of the user's eye gaze; and
   generate control signals for the electronic device to move an object of interest (OOI) affected by the electronic device;
   wherein the control signals are generated in accordance to only one of the head signals and the eye gaze signals depending on the eye gaze signals, such that the control signals to move the OOI are generated in accordance to the head signals and not the eye gaze signals when the user's eye gaze is detected and the eye gaze signals indicate a change in the user's eye gaze that is less than an eye gaze motion threshold, and the control signals to move the OOI are generated in accordance to the eye gaze signals and not the head signals when the user's eye gaze is detected and the eye gaze signals indicate a change in the user's eye gaze that is greater than or equal to the eye gaze motion threshold; wherein the eye gaze motion threshold is a specified amount of motion of the user's eye gaze and the eye gaze motion threshold is different than zero; and
   wherein motion of the OOI resulting from a given amount of displacement performed by the user by using their head is less than motion of the OOI resulting from the given amount of displacement performed by the user by using their eye gaze.

2. The system of claim 1, wherein the microprocessor is configured to receive third signals indicative of magnitude of at least one facial expression of the user, wherein the magnitude of the at least one facial expression of the user is determined based on motion or position of at least one facial muscle of the user.

3. The system of claim 1, wherein the OOI comprises a graphical object affected by the electronic device.

4. The system of claim 1, wherein the OOI comprises a mouse pointer.

5. The system of claim 1, further comprising a first sensor, wherein the first sensor provides at least one of the head signals and the eye gaze signals.

6. The system of claim 5, wherein the first sensor comprises an image sensor.

7. The system of claim 5, wherein the first sensor comprises an inertial sensor.

8. The system of claim 5, wherein the first sensor comprises an eye gaze tracking system.

9. The system of claim 5, wherein the OOI comprises a graphical object affected by the electronic device.

10. The system of claim 5, wherein the OOI comprises a mouse pointer.

11. The system of claim 2, wherein the control signals are not generated when the third signals indicate the magnitude of the at least one facial expression is less than or equal to a facial expression threshold.

12. The system of claim 1, wherein the change in the user's eye gaze is calculated independent of the location of the OOI.

13. The system of claim 1, wherein a head gain curve relates the at least one of motion and position of the user's head to motion of the OOI resulting from the control signals generated in accordance to the head signals, an eye gaze gain curve relates motion of the user's eye gaze to motion of the OOI resulting from the control signals generated in accordance to the eye gaze signals, and the head gain curve is flatter than the eye gaze gain curve.

14. A non-transitory computer readable medium comprising one or more programs configured to be executed by one or more processors to enable a user to communicate with an electronic device, said one or more programs causing performance of a method comprising:
   receiving head signals indicative of at least one of motion and position of the user's head;
   receiving eye gaze signals indicative of the user's eye gaze; and
   generating control signals for the electronic device to move an object of interest (OOI) affected by the electronic device,
   wherein the control signals are generated in accordance to only one of the head signals and the eye gaze signals depending on the eye gaze signals, such that the control signals to move the OOI are generated in accordance to the head signals and not the eye gaze signals when the user's eye gaze is detected and the eye gaze signals indicate a change in the user's eye gaze that is less than an eye gaze motion threshold, and the control signals to move the OOI are generated in accordance to the eye gaze signals and not the head signals when the user's eye gaze is detected and the eye gaze signals indicate a change in the user's eye gaze that is greater than or equal to the eye gaze motion threshold; wherein the eye gaze motion threshold is a specified amount of motion of the user's eye gaze and the eye gaze motion threshold is different than zero; and
   wherein motion of the OOI resulting from a given amount of displacement performed by the user by using their head is less than or equal to motion of the OOI resulting from the given amount of displacement performed by the user by using their eye gaze.

15. The non-transitory computer readable medium of claim 14, wherein the method further comprises receiving third signals indicative of magnitude of at least one facial expression of the user, wherein the magnitude of the at least one facial expression of the user is determined based on motion or position of at least one facial muscle of the user.

16. The non-transitory computer readable medium of claim 15, wherein the control signals are not generated when the third signals indicate the magnitude of the at least one facial expression is less than or equal to a facial expression threshold.

17. The non-transitory computer readable medium of claim 14, wherein the change in the user's eye gaze is calculated independent of the location of the OOI.

18. The non-transitory computer readable medium of claim 14, wherein a head gain curve relates the at least one of motion and position of the user's head to motion of the OOI resulting from the control signals generated in accordance to the head signals, an eye gaze gain curve relates motion of the user's eye gaze to motion of the OOI resulting from the control signals generated in accordance to the eye gaze signals, and the head gain curve is flatter than the eye gaze gain curve.

19. An apparatus for a user to control an electronic device, the apparatus comprising:
   memory;
   a microprocessor configured to:
      receive head signals indicative of at least one of motion and position of the user's head;
      receive eye gaze signals indicative of the user's eye gaze; and
      generate control signals to move an object of interest (OOI) affected by the electronic device; and
   a first sensor configured to provide at least one of the head signals and the eye gaze signals;
   wherein the control signals are generated in accordance to only one of the head signals and the eye gaze signals depending on the eye gaze signals, such that the control signals to move the OOI are generated in accordance to the head signals and not the eye gaze signals when the user's eye gaze is detected and the eye gaze signals indicate a change in the user's eye gaze that is less than an eye gaze motion threshold, and the control signals to move the OOI are generated in accordance to the eye gaze signals and not the head signals when the user's eye gaze is detected and the eye gaze signals indicate a change in the user's eye gaze that is greater than or equal to the eye gaze motion threshold; wherein the eye gaze motion threshold is a specified amount of motion of the user's eye gaze and the eye gaze motion threshold is different than zero; and
   wherein motion of the OOI resulting from a given amount of displacement performed by the user by using their head is less than or equal to motion of the OOI resulting from the given amount of displacement performed by the user by using their eye gaze.

20. The apparatus of claim 19, wherein the OOI comprises a graphical object affected by the electronic device.

21. The apparatus of claim 19, wherein the OOI comprises a mouse pointer.

22. The apparatus of claim 19, wherein the apparatus is part of the electronic device.

23. The apparatus of claim 19, wherein the microprocessor is further configured to receive third signals indicative of magnitude of at least one facial expression of the user, wherein the magnitude of the at least one facial expression of the user is determined based on motion or position of at least one facial muscle of the user.

24. The apparatus of claim 19, wherein the first sensor comprises an image sensor.

25. The apparatus of claim 19, wherein the first sensor comprises an inertial sensor.

26. The apparatus of claim 19, wherein the first sensor comprises an eye gaze tracking system.

27. The apparatus of claim 22, wherein the OOI comprises a graphical object affected by the electronic device.

28. The apparatus of claim 22, wherein the OOI comprises a mouse pointer.

29. The apparatus of claim 19, wherein said apparatus is worn on the user's body.

30. The apparatus of claim 23, wherein the control signals to move the OOI are not generated when the third signals indicate the magnitude of the at least one facial expression is less than or equal to a facial expression threshold.

31. The apparatus of claim 19, wherein the change in the user's eye gaze is calculated independent of the location of the OOI.

32. The apparatus of claim 19, wherein a head gain curve relates the at least one of motion and position of the user's head to motion of the OOI resulting from the control signals generated in accordance to the head signals, an eye gaze gain curve relates motion of the user's eye gaze to motion of the OOI resulting from the control signals generated in accordance to the eye gaze signals, and the head gain curve is flatter than the eye gaze gain curve.

33. A computer implemented method for a user to communicate with an electronic device, said computer implemented method comprising:
   receiving head signals indicative of at least one of motion and position of the user's head, wherein the head signals are provided by a first sensor;
   receiving eye gaze signals indicative of the user's eye gaze, wherein the eye gaze signals are provided by a second sensor; and
   generating control signals to move an object of interest OOI affected by the electronic device,
   wherein the control signals are generated in accordance to only one of the head signals and the eye gaze signals depending on the eye gaze signals, such that the control signals to move the OOI are generated in accordance to the head signals and not the eye gaze signals when the user's eye gaze is detected by the second sensor and the eye gaze signals indicate a change in the user's eye gaze that is less than a first eye gaze motion threshold, and the control signals to move the OOI are generated in accordance to the eye gaze signals and not the head signals when the user's eye gaze is detected by the second sensor and the eye gaze signals indicate a change in the user's eye gaze that is greater than or equal to a second eye gaze motion threshold; wherein the first and second eye gaze motion thresholds are each a specified amount of motion of the user's eye gaze and the first and second eye gaze motion thresholds are different than zero; and
   wherein motion of the OOI resulting from a given amount of displacement performed by the user by using their head is less than motion of the OOI resulting from the given amount of displacement performed by the user by using their eye gaze.

34. The computer implemented method of claim 33, further comprising:

receiving third signals indicative of magnitude of at least one facial expression of the user, wherein the magnitude of the at least one facial expression of the user is determined based on motion or position of at least one facial muscle of the user.

35. The computer-implemented method of claim 33, wherein the first eye gaze motion threshold is equal to the second eye gaze motion threshold.

36. The computer implemented method of claim 34, further comprising:
not generating the control signals when the third signals indicate the magnitude of the at least one facial expression of the user is less than or equal to a facial expression threshold.

37. The computer implemented method of claim 33, wherein the change in the user's eye gaze is calculated independent of the location of the OOI.

38. The computer implemented method of claim 33, wherein a head gain curve relates the at least one of motion and position of the user's head to motion of the OOI resulting from the control signals generated in accordance to the head signals, an eye gaze gain curve relates motion of the user's eye gaze to motion of the OOI resulting from the control signals generated in accordance to the eye gaze signals, and the head gain curve is flatter than the eye gaze gain curve.

* * * * *